US012551798B2

(12) United States Patent
Fukada

(10) Patent No.: US 12,551,798 B2
(45) Date of Patent: Feb. 17, 2026

(54) STORAGE MEDIUM, INFORMATION PROCESSING SYSTEM, INFORMATION PROCESSING APPARATUS, AND GAME PROCESSING METHOD

(71) Applicant: NINTENDO CO., LTD., Kyoto (JP)

(72) Inventor: Naoki Fukada, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 253 days.

(21) Appl. No.: 18/510,111

(22) Filed: Nov. 15, 2023

(65) Prior Publication Data

US 2024/0359103 A1 Oct. 31, 2024

(30) Foreign Application Priority Data

Apr. 25, 2023 (JP) ................................ 2023-071577

(51) Int. Cl.
*A63F 13/577* (2014.01)

(52) U.S. Cl.
CPC ...... *A63F 13/577* (2014.09); *A63F 2300/643* (2013.01)

(58) Field of Classification Search
CPC ......................... A63F 13/577; A63F 2300/643
USPC ........................................................... 463/31
See application file for complete search history.

(56) References Cited

U.S. PATENT DOCUMENTS 9,427,668 B2 * 8/2016 Asuke .................. A63F 13/577
2005/0101365 A1 5/2005 Ogita et al.
2012/0303343 A1 11/2012 Sugiyama et al.
2021/0118221 A1 * 4/2021 Liu ....................... A63F 13/426
2022/0203237 A1 * 6/2022 Kutcher .................. A63F 13/56
2023/0166190 A1 * 6/2023 Wan ...................... A63F 13/803
463/31

FOREIGN PATENT DOCUMENTS

JP 2005-100133 4/2005
JP 2012-247953 12/2012
JP 2017-113137 6/2017
JP 2018-102745 7/2018

OTHER PUBLICATIONS

"The Legend of Zelda Breath of the Wild", [online], Nintendo of America Inc., [searched on Apr. 21, 2023], internet URL: https://www.zelda.com/breath-of-the-wild/, 3 pages.

* cited by examiner

*Primary Examiner* — Allen Chan
(74) *Attorney, Agent, or Firm* — Nixon & Vanderhye PC

(57) ABSTRACT

An example of an information processing system, in response to a first instruction based on an operation input, generates a first composite equipment item object in place of a first equipment item object designated from among a plurality of equipment item objects and a first item object designated from among a plurality of item objects present in a virtual space. The information processing system causes a player character to possess the first composite equipment item object. The first item object has a first collision. The first equipment item object has a second collision. The information processing system generates a third collision based on the first collision, and generates a fourth collision based on the third collision and the second collision. The fourth collision is a collision of the first composite equipment item object.

26 Claims, 22 Drawing Sheets

STORAGE MEDIUM, INFORMATION PROCESSING SYSTEM, INFORMATION PROCESSING APPARATUS, AND GAME PROCESSING METHOD

CROSS REFERENCE TO RELATED APPLICATION

This application claims priority to Japanese Patent Application No. 2023-071577, filed on Apr. 25, 2023, the entire contents of which are incorporated herein by reference.

FIELD

The present disclosure relates to a storage medium, an information processing system, an information processing apparatus, and a game processing method which generate a determination area (also referred to as "collision") used for collision determination on objects in a virtual space.

BACKGROUND AND SUMMARY

Conventionally, there are games in which various types of weapon items appear.

If more types of equipment items are desired to appear in a game, the labor of generating collisions used for collision determination increases with an increase in the types of equipment items.

Therefore, the present specification discloses a storage medium, an information processing system, an information processing apparatus, and a game processing method capable of automatically generating collisions while increasing the types of equipment items.

(1)

An example of a non-transitory computer-readable storage medium described herein stores therein instructions that, when executed, cause a processor of an information processing apparatus to execute game processing, comprising: controlling a player character, based on an operation input; generating a first composite equipment item object in response to a first instruction based on an operation input so that a first equipment item object and a first item object are replaced with the first composite equipment item object, the first equipment item object being designated from among a plurality of equipment item objects that the player character possesses and is able to equip and use, the first item object being designated from among a plurality of item objects present in a virtual space, the first composite equipment item object being obtained by compositing the first equipment item object and the first item object, the player character possessing the first composite equipment item object, and being able to equip and use the first composite equipment item object; causing, in response to the first instruction, the player character to possess the first composite equipment item object; and generating, in response to the first instruction, a third collision based on a first collision of the first item object, and a fourth collision based on the third collision and a second collision of the first equipment item object, the fourth collision being a collision of the first composite equipment item object.

According to the above configuration (1), since a new composite equipment item object can be generated by compositing an item object and an equipment item object, many types of items are allowed to appear in the game. Moreover, according to the above configuration (1), the collision of the composite equipment item object can be automatically generated.

(2)

In configuration (1) above, the game processing may comprise performing collision determination by using the first collision when the first item object is placed in the virtual space.

According to the above configuration (2), the collision of the composite equipment item object after composition based on the first item object can be generated by using the collision of the first item object that is the original item object.

(3)

In configuration (1) or (2) above, the game processing may comprise setting, based on a shape of the first collision, a polyhedron having not more than a certain number of apexes as the third collision.

According to the above configuration (3), since the number of apexes of the second collision can be restricted to not more than the certain number, the amount of data of the fourth collision can be reduced.

(4)

In configuration (3) above, the game processing may comprise: calculating points on the first collision which are respectively closest to a plurality of points set outside the first collision; and setting, as the third collision, a polyhedron having, as the apexes, at least some of the closest points.

According to the above configuration (4), the second collision can be formed in a shape reflecting the shape of the first collision.

(5)

In configuration (4) above, the plurality of points outside the first collision may be set at positions of apexes of a rectangular parallelepiped containing the first collision and at center positions of planes of the rectangular parallelepiped.

According to the above configuration (5), the second collision can be formed in a shape reflecting the shape of the first collision.

(6)

In configuration (4) or (5) above, a convex polyhedron having, as apexes, at least some of the closest points may be set as a shape of the third collision.

According to the above configuration (6), a collision having an appropriate shape can be generated as a collision used for the composite equipment item such as a weapon or a protective gear.

(7)

In configuration (6) above, out of the closest points, a point at a position that is not an apex of the convex polyhedron may be deleted, and the convex polyhedron having the remaining points as the apexes may be set as the shape of the third collision.

According to the above configuration (7), the second collision having a convex shape can be easily generated.

(8)

In any one of configurations (1) to (7) above, the game processing may comprise, if the first item object is a predetermined type of item object, replacing the first collision with a collision having a different shape when the first composite equipment item object is generated.

According to the above configuration (8), the fourth collision having a shape matching the appearance of the composite equipment item object can be easily generated.

(9) In any one of configurations (1) to (7) above, the game processing may comprise: generating a 3D model of the first composite equipment item object as a model in which the first item object is disposed at a tip of the first equipment item object; and generating the fourth collision as a shape in which the third collision is disposed at a tip of the second collision.

According to the above configuration (9), the fourth collision having an appropriate shape matching the appearance of the composite equipment item object can be generated.

(10)

In configuration (9) above, the fourth collision may be generated by deleting at least a part, on a tip side, of the second collision.

According to the above configuration (10), the fourth collision can be formed in a shape matching the appearance of the composite equipment item object.

(11)

In any one of configurations (1) to (10) above, the fourth collision may be generated by scaling at least one of the first collision and the third collision.

According to the above configuration (11), even when the size of a part, corresponding to the first item object, of the composite equipment item object is different from the size of the original first item object, the fourth collision having a shape according to the appearance of the composite equipment item object can be generated.

(12)

In any one of configurations (1) to (11) above, each of the second collision and the third collision may be a convex polyhedron.

According to the above configuration (12), since the second collision and the third collision having appropriate shapes are used as collisions for the composite equipment item object such as a weapon or a protective gear, the fourth collision having an appropriate shape can be easily generated.

(13)

Another example of a non-transitory computer-readable storage medium described herein stores therein instructions that, when executed, cause a processor of an information processing apparatus to execute game processing, comprising: controlling a player character, based on an operation input: generating, in response to a first instruction based on an operation input, a first equipment item object that the player character possesses and is able to equip and use, by using at least a first item object designated from among a plurality of item objects present in a virtual space: causing, in response to the first instruction, the player character to possess the first equipment item object: and generating, in response to the first instruction, a second collision based on a first collision of the first item object, the second collision being a collision of the first equipment item object.

According to the above configuration (13), the collision of the equipment item object can be automatically generated while increasing the types of equipment item objects.

This specification discloses examples of an information processing apparatus and an information processing system executing the processes in the above (1) to (13). In addition, this specification discloses an example of a game processing method for executing the processes in the above (1) to (13).

According to the storage medium, the information processing system, the information processing apparatus, and the game processing method, collisions of items can be automatically generated.

These and other objects, features, aspects and advantages of the exemplary embodiment will become more apparent from the following detailed description when taken in conjunction with the accompanying drawings.

DETAILED DESCRIPTION OF NON-LIMITING EXAMPLE EMBODIMENTS

1. Configuration of Game System

A game system according to an example of an exemplary embodiment is described below. An example of a game system 1 according to the exemplary embodiment includes a main body apparatus (an information processing apparatus: which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
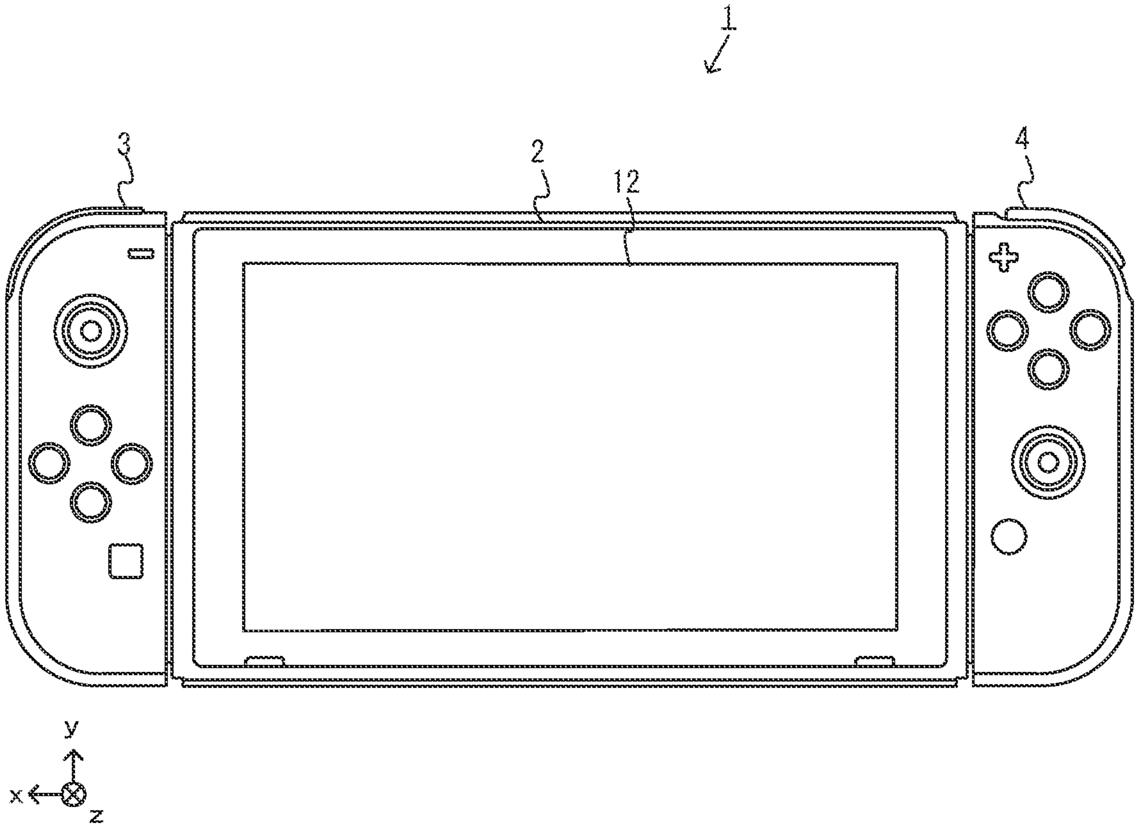
FIG. 1 is a view showing an example where a non-limiting left controller and a non-limiting right controller are attached to a non-limiting main body apparatus.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
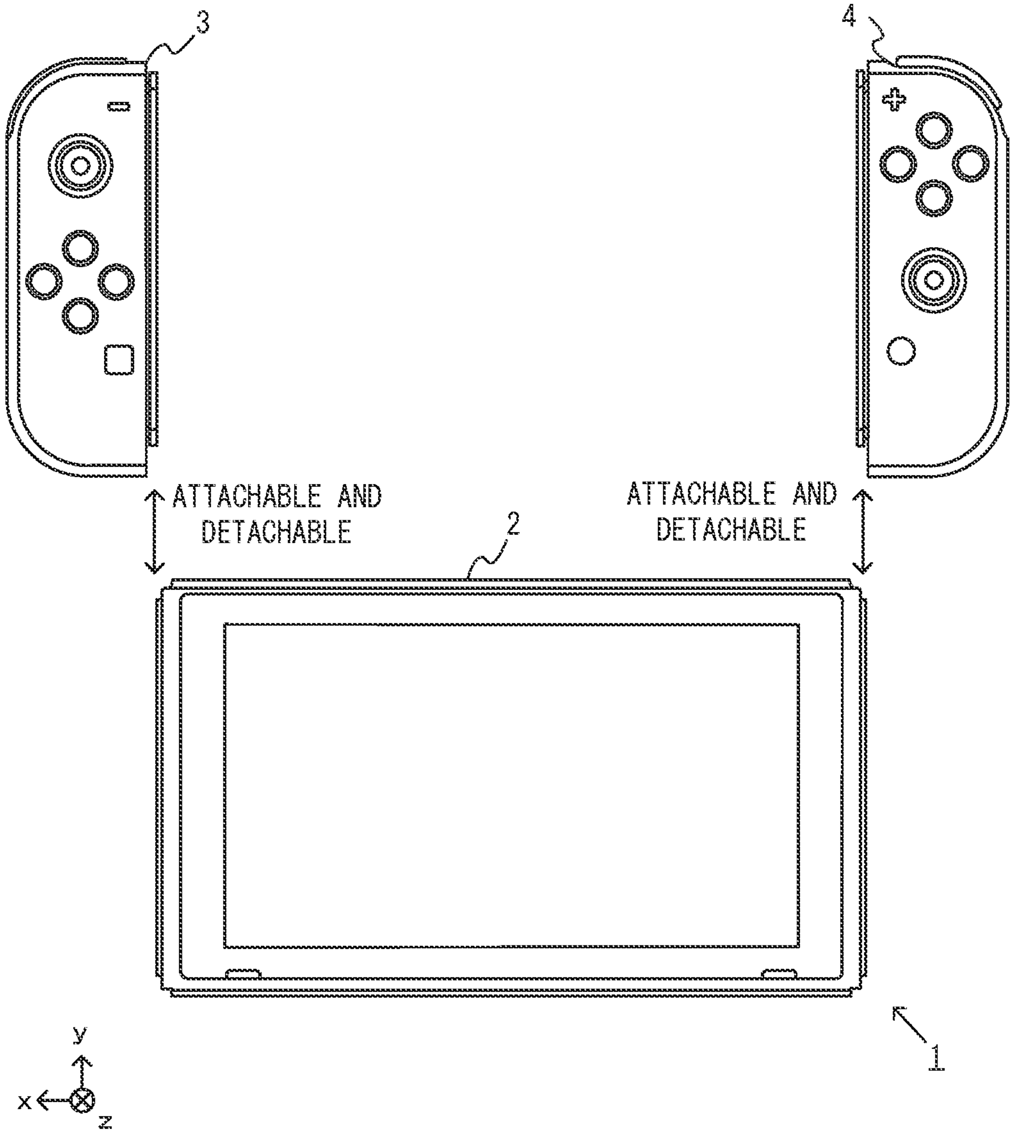
FIG. 2 is a view showing an example where a non-limiting left controller and a non-limiting right controller are removed from a non-limiting main body apparatus.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a “controller”.

Figure 3:
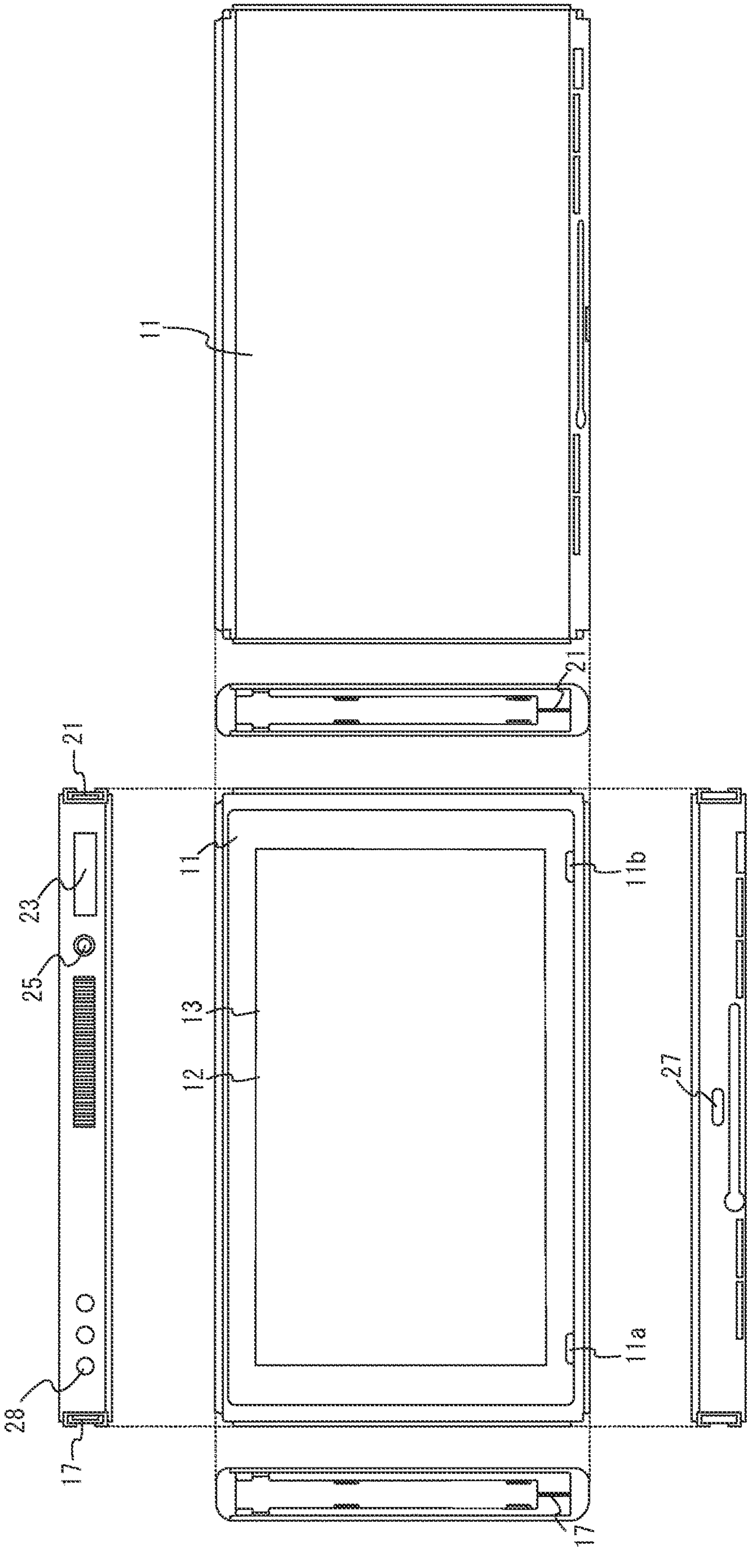
FIG. 3 is a six-sided view showing an example of a non-limiting main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11*a* and 11*b* are formed on the main surface of the housing 11. Then, sounds output from the speakers 88 are output through the speaker holes 11*a* and 11*b*.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
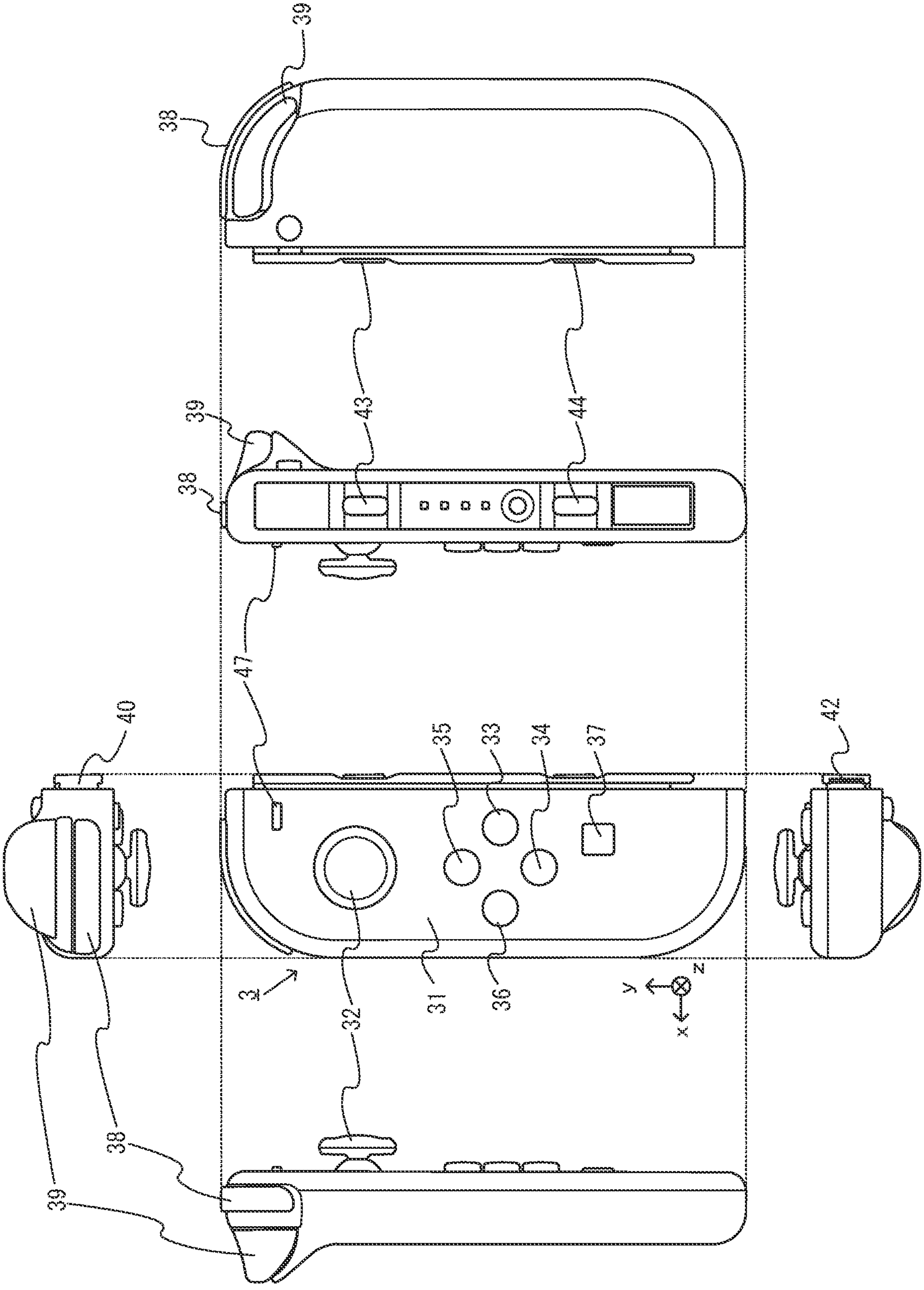
FIG. 4 is a six-sided view showing an example of a non-limiting left controller.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
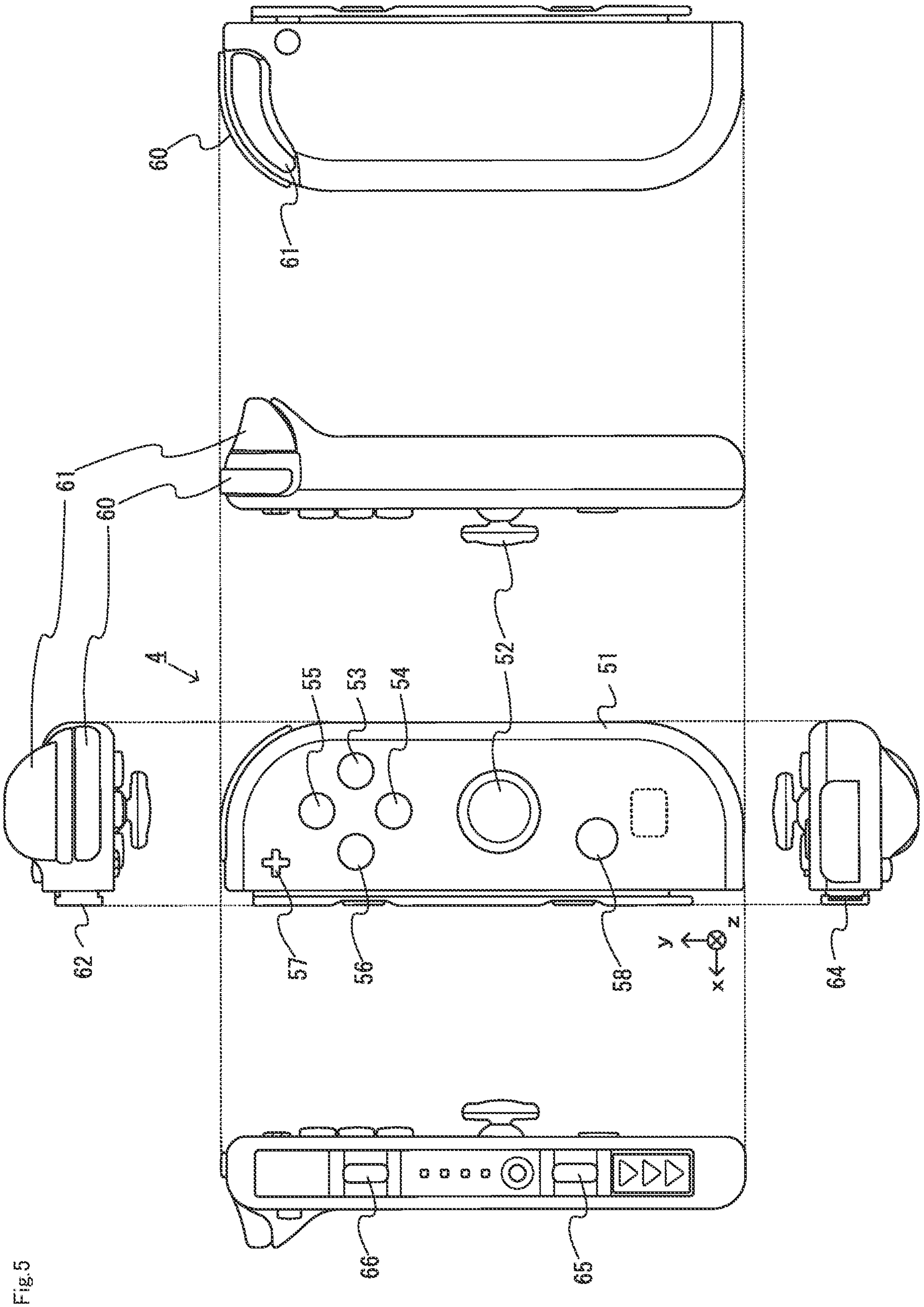
FIG. 5 is a six-sided view showing an example of a non-limiting right controller.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
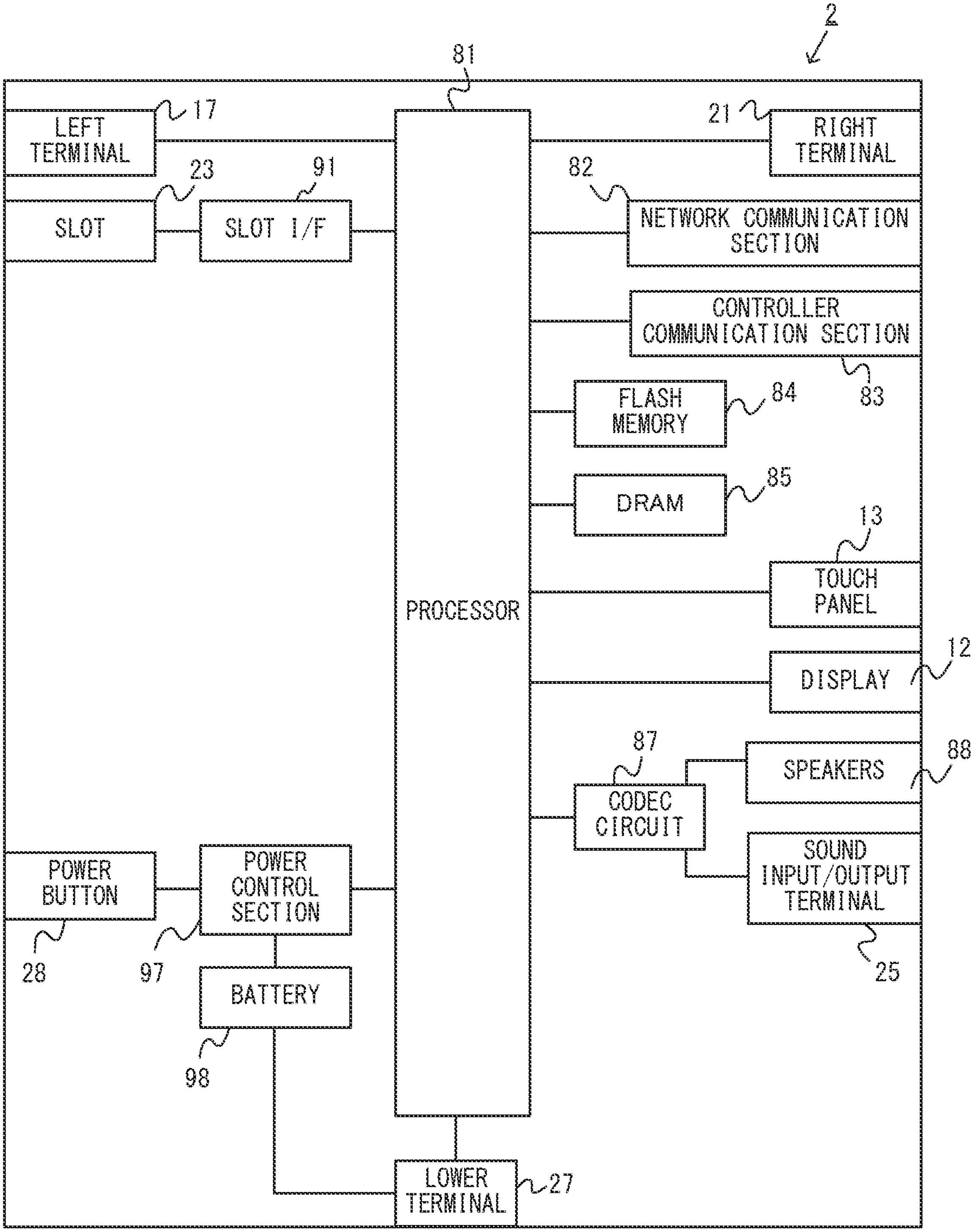
FIG. 6 is a block diagram showing an example of an internal configuration of a non-limiting main body apparatus.

FIG. 6 is a block diagram showing an example of the internal configuration of the main body apparatus 2. The main body apparatus 2 includes components 81 to 85, 87, 88, 91, 97, and 98 shown in FIG. 6 in addition to the components shown in FIG. 3. Some of the components 81 to 85, 87, 88, 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
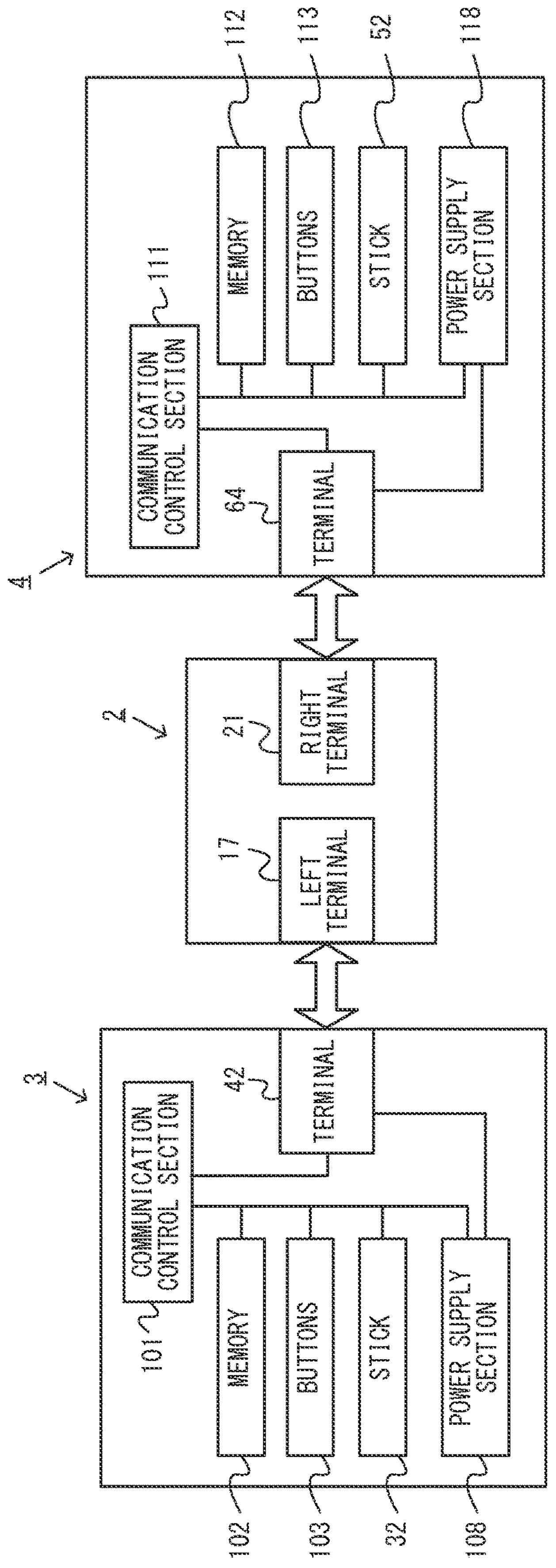
FIG. 7 is a block diagram showing an example of an internal configuration of a non-limiting main body apparatus, a non-limiting left controller and a non-limiting right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103 and the analog stick 32). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113 and the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

2. Outline of Processing in Game System

Hereinafter, an outline of game processing executed in the game system 1 will be described. In the exemplary embodiment, the game system 1 executes game processing for a game in which a player (in other words, a user) operates a player character on a virtual game field. In the exemplary embodiment, the game system 1 composites an equipment item object (hereinafter, referred to as "equipment item") and a material item object (hereinafter, referred to as "material item") to generate a new equipment item (referred to as "composite equipment item").

Among item objects that appear in the game, an equipment item is an item object that the player character can be equipped with, and use. Examples of the equipment item include a sword, a shield, a bow, etc. The equipment items are not limited to the specific examples described above. The state where "the player character is equipped with an equipment item" is a state where the player character can use the equipment item (i.e., can perform an action with the equipment item, such as swinging a sword, holding a shield, or shooting an arrow with a bow). In the exemplary embodiment, the player character can be equipped with an equipment item that is designated by the player from among equipment items possessed by the player character.

Among the item objects that appear in the game, a material item is an item object that can be a material for composition with an equipment item (i.e., can be composited with the equipment item). In the exemplary embodiment, various types of item objects that appear in the game can be material items. For example, item objects, such as a stone object and a log object, that are placed (or lying) on the game field can be material items. In addition, for example, an object, such as a nut object, that the player character can get from an object (e.g., a tree object) placed on the game field can be a material item. Moreover, for example, an object, such as a monster's horn object, that the player character can obtain from a character (e.g., enemy character) appearing in the game field (e.g., by defeating the character) can be a material item. In the exemplary embodiment, the aforementioned equipment items can also be material items. The material items are not limited to the specific examples described above.

A composite equipment item is an item object obtained by compositing an equipment item and a material item. The composite equipment item is an item object that the player character can be equipped with, and use, like an equipment item. In the exemplary embodiment, the word "composite" of the composite equipment item means that the composite equipment item is generated in exchange of the equipment item and material item as original items. That is, when the composite equipment item is generated, the original equipment item and the original material item disappear. Although described later in detail, there is no limitation on the specific process for compositing an equipment item and a material item.

[2-1. Outline of Composition Process]

Figure 8:
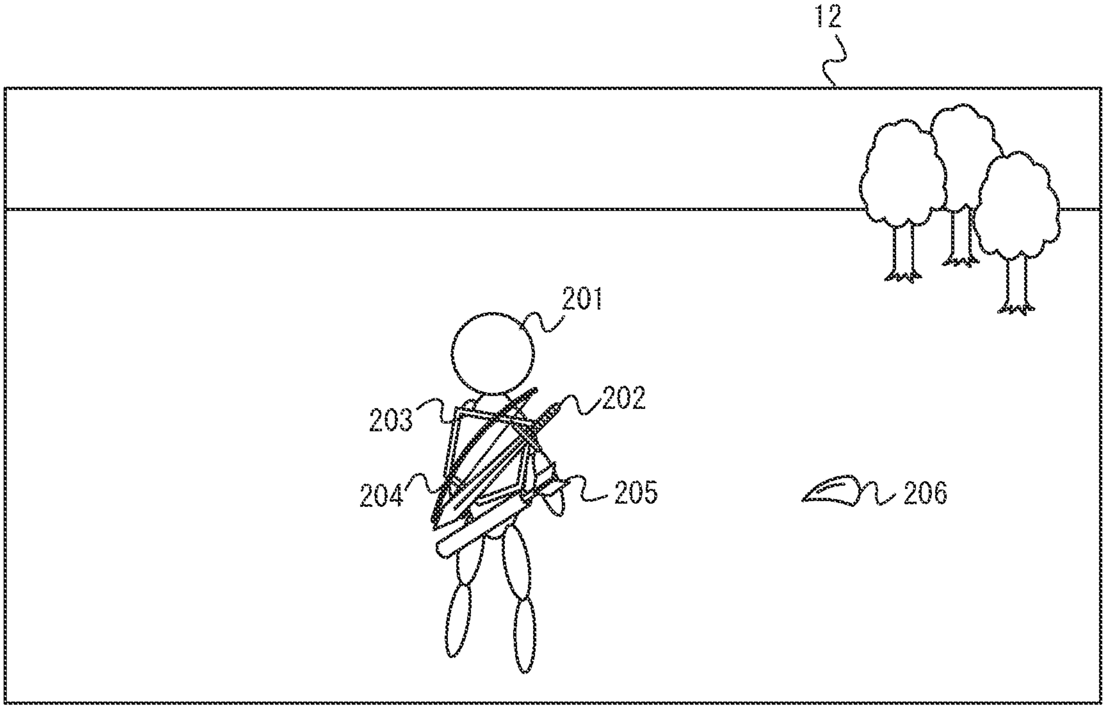
FIG. 8 shows an example of a game image showing a game field in which a player character is placed.

An outline of a composition process for generating a composite equipment item will be described with reference to FIGS. 8 to 10. FIG. 8 shows an example of a game image showing a game field where a player character is placed. The game image is displayed on the display 12 of the main body apparatus 2 in the exemplary embodiment, but may be displayed on another display device connected to the main body apparatus 2.

In the situation shown in FIG. 8, a player character 201 is equipped with a sword object 202, a shield object 203, and bow and arrow objects (specifically, a bow object 204 and an arrow object 205) as equipment items. Thus, in the exemplary embodiment, the player character 201 can be equipped with a plurality of types of equipment items at the same time. Specifically, the player character 201 can be equipped with one short-distance equipment item, one defense equipment item, and one long-distance equipment item. The short-distance equipment item is a weapon-type equipment item, such as the sword object 202, with which the player character 201 can perform a short-distance attack. The defense equipment item is an equipment item, such as the shield object 203, with which the player character 201 can perform defense. The long-distance equipment item is a weapon-type equipment item, such as the bow and arrow objects, with which the player character 201 can perform a long-distance attack. In the exemplary embodiment, in the state where the player character 201 is equipped with the equipment items, the player character 201 wears at least some of the equipment items (see FIG. 8). In other embodiments, the number of equipment items that the player character 201 can be equipped with at the same time is not limited, and may be one.

In the situation shown in FIG. 8, a tusk object 206 as an example of the material item is placed on the game field. The tusk object 206 represents a tusk of an enemy character (not shown), and is placed on the game field when the player character 201 has defeated the enemy character, for example.

In the exemplary embodiment, during the game, the player can perform a composition instruction to composite an equipment item and a material item. For example, the game system 1 receives the composition instruction on the condition that the player character 201 is in the state of being able to exert capability of performing composition (referred to as "composition possible state"). The composition possible state may be, for example, a state where the player character can use a specific item for performing composition, or a state where the player character can use a specific skill for performing composition. In other embodiments, the player may be able to perform a composition instruction while the player character 201 is in any state (i.e., without any condition).

Figure 9:
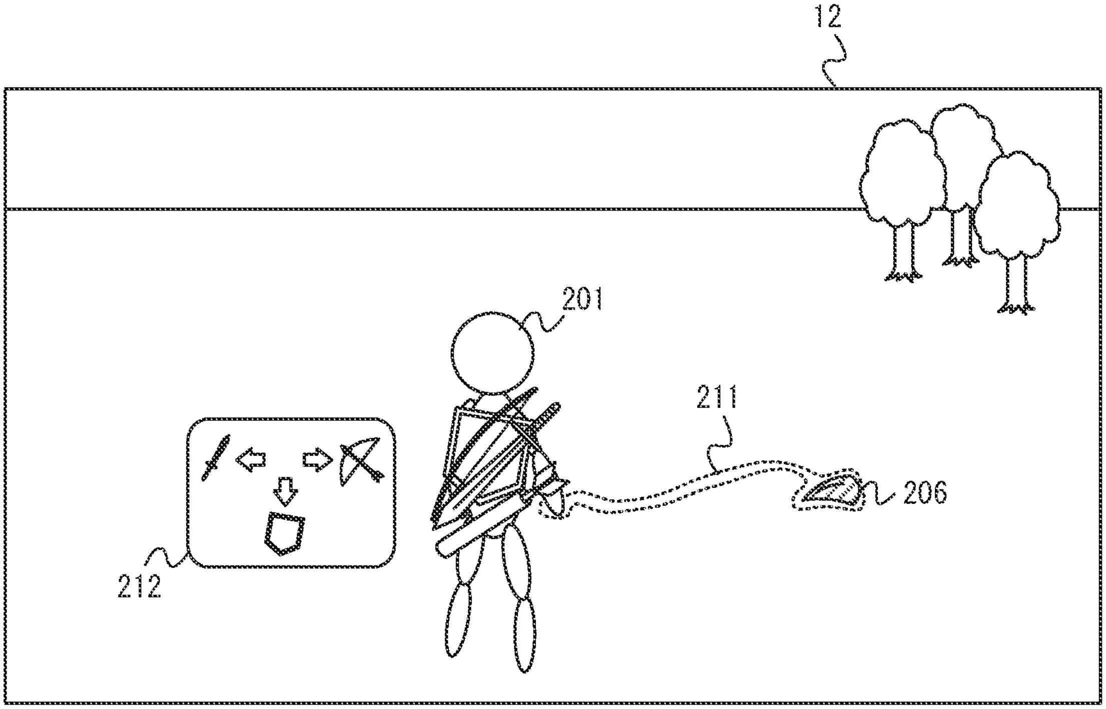
FIG. 9 shows an example of a game image when the player character has entered a composition possible state, from the situation shown in FIG. 8.
Figure 10:
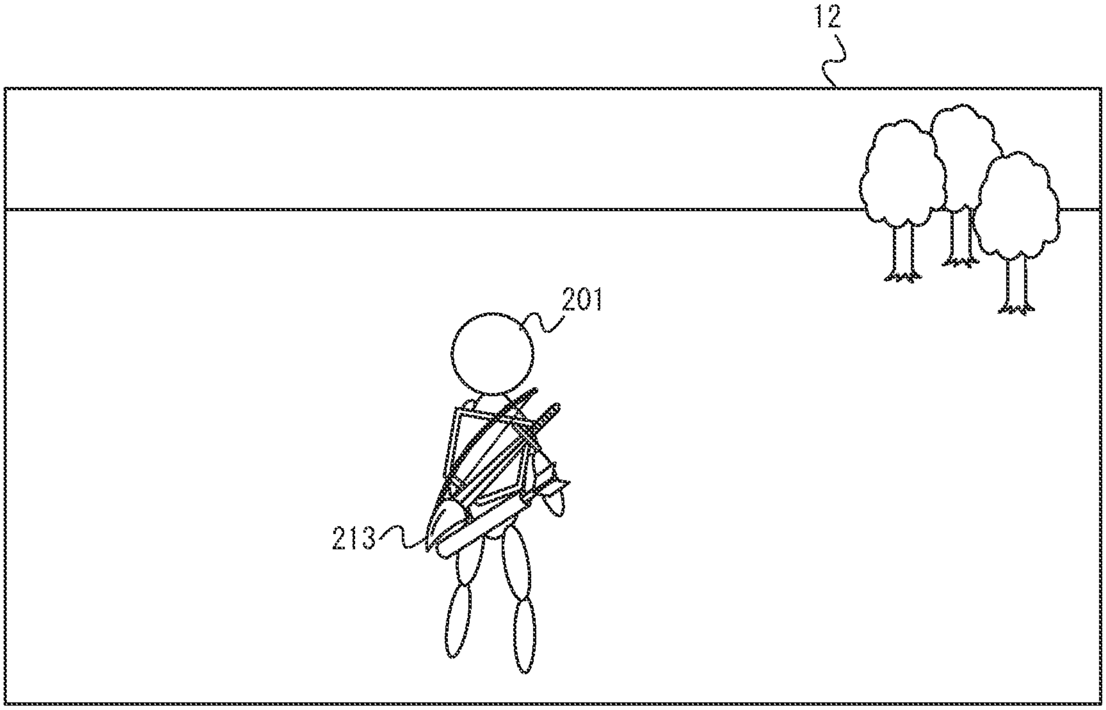
FIG. 10 shows an example of a game image including the player character equipped with a generated composite equipment item.

FIG. 9 shows an example of a game image when the player character has entered the composition possible state from the situation shown in FIG. 8. In the exemplary embodiment, when the player character 201 enters the composition possible state (i.e., when the composition instruction is allowed), the material item is displayed in an emphasized mode. Specifically, the material item is displayed in a display mode different from that for objects other than the material item. More specifically, the material item is displayed in a color different from that of the other objects, or is displayed with an effect image added thereto. In the example shown in FIG. 9, the tusk object 206 as a material item is displayed in a display mode different from that for the other objects (e.g., tree objects). In FIG. 9, the difference in display mode is represented by hatched lines. Thus, the game system 1 can present, to the user, the object being the material item among the objects on the game field so that the player can easily recognize the object, in the state where the game image showing the game field is displayed.

In the exemplary embodiment, when the player character is in the composition possible state, if a material item that can be composited is present in the game field, the game system 1 displays an effect image 211 indicating the material item to be composited (referred to as "target material item") (see FIG. 9). In the exemplary embodiment, the target material item is determined based on the position and/or the orientation of the player character 201. Specifically, among material items present within a determination range that is set based on the position and the orientation of the player character 201, a material item positioned closest to the player character 201 is determined to be a target material item. The determination range is, for example, a range that is forward of the player character 201 (specifically, an angular range of a predetermined angle to the left and right sides with respect to the forward direction) and is within a predetermined distance from the position of the player character 201. Therefore, by moving the player character 201 in the game field, the player can designate a target material item from among the material items present in the game field. In other embodiments, there is no limitation on the method for designating a target material item from among the material items present in the game field.

If a material item to be a target material item does not exist among the material items present in the game field (i.e., if a material item does not exist in the determination range), the effect image 211 is not displayed, and the game system 1 does not receive the composition instruction. That is, in this case, the player character 201 cannot perform composition.

In the exemplary embodiment, the effect image 211 has an integral shape that encloses the tusk object 206 as the target material item and a part (right hand in FIG. 9) of the player character 201, and connects these objects (see FIG. 9). Thus, the effect image associating the target material item with the player character allows the player to more easily recognize the target material item.

In the exemplary embodiment, among the equipment items that the player character 201 is equipped with, an equipment item (referred to as "target equipment item") to be subjected to the composition process is designated by the player. Specifically, the game system 1 display an equipment designation image 212 as an image for the player to designate the target equipment item (see FIG. 9). The equipment designation image 212 is displayed when a composite equipment item can be generated (i.e., when a target material item is placed within the determination range of the player character 201 in the composition possible state). The equipment designation image 212 is an image showing, as options, a plurality of equipment items that the player character is being equipped with. In the exemplary embodiment, the game system 1 performs a process of compositing an equipment item designated by the player from among the options shown in the equipment designation image 212, with the target material item. As described above, by using the equipment designation image 212, the game system 1 can present, to the player, an instruction for designating a target equipment item so that the player can easily recognize the instruction. In other embodiments, the game system 1 may receive the composition instruction without displaying the equipment designation image 212.

In the exemplary embodiment, the equipment designation image 212 shows the correspondence between instructions for designating a target equipment item and the equipment items. Specifically, the equipment designation image 212 includes: an image showing the correspondence between an instruction indicating the left direction and the short-distance equipment item: an image showing the correspondence between an instruction indicating the right direction and the long-distance equipment item: and an image showing the correspondence between an instruction indicating the down direction and the defense equipment item (see FIG. 9). In the state where the equipment designation image 212 is displayed, the player performs one instruction among the instructions in the left direction, right direction, and down direction (e.g., an instruction by pressing one of the left direction button 36, the right direction button 33, and the down direction button 34 of the left controller 3). When one of these instructions has been performed by the player, the game system 1 determines an equipment item corresponding to this instruction as a target equipment item.

In the exemplary embodiment, in response to the instruction designating the target equipment item, the game system 1 composites the equipment item corresponding to the instruction with the target material item. That is, in the exemplary embodiment, the instruction designating the target equipment item also serves as a composition instruction for compositing the equipment item and the target material item. This allows the player to easily perform the operation for the composition process in the case where the player character is equipped with a plurality of equipment items.

There is no limitation on the method for determining a target equipment item. In other embodiments, for example, the game system 1 may determine, as a target equipment item, an equipment item for which the player character 201 takes a motion of holding the same, among the equipment items.

As described above, in the exemplary embodiment, the game system 1 generates the composite equipment item in response to the composition instruction performed by the player. FIG. 10 shows an example of the game image including the player character equipped with the generated composite equipment item. In FIG. 10, as a result of the composition instruction by the player designating the sword object 202 in the state shown in FIG. 9, the player character 201 is equipped with a composite equipment item 213 obtained by compositing the sword object 202 and the tusk object 206.

In the exemplary embodiment, when the composition instruction has been performed, the game system 1 firstly brings the target material item (in FIG. 9, tusk object 206) on the game field close to the player character 201 (or the target equipment item). In the example shown in FIGS. 9 and 10, the game system 1 performs a display such that the tusk object 206 is attracted toward the player character 201 by the effect image 211. When the target material item comes close to the player character 201, the game system 1 deletes the target material item and changes the target equipment item that the player character 201 is equipped with, to the composite equipment item 213 (see FIG. 10). Thus, in generating the composite equipment item, the original material item from which the composite equipment item is generated can be presented to the player so that the player can easily recognize the material item. There is no limitation on the behaviors of the target material item, the target equipment item, and the player character in generating the composite equipment item.

In the exemplary embodiment, the appearance of the composite equipment item is determined based on the target material item and the target equipment item. For example, the composite equipment item 213 shown in FIG. 10 has an appearance in which the tusk object 206 is integrated with a tip portion of the sword object 202 (or an appearance in which the tip portion of the sword object 202 is replaced with the tusk object 206). Thus, in the exemplary embodiment, the composite equipment item has an appearance including: at least a part of the appearance of the original equipment item being an origin of the composite equipment item: and at least a part of the appearance of the material item being an origin of the composite equipment item. This allows the composite equipment item to give, to the player, an impression that it is an object obtained by combining the equipment item and the material item. Moreover, the appearance of the composite equipment item allows the player to easily recognize the equipment item and the material item that are the origins of the composite equipment item. There is no limitation on the appearance of the composite equipment item. The composite equipment item may have an appearance that does not have a portion overlapping the appearance of the original material item and/or the appearance of the original equipment item.

In the exemplary embodiment, in the composition process, the game system 1 generates the composite equipment item based on the target equipment item and the target material item. That is, the game system 1 generates a three-dimensional model of the composite equipment item by using a three-dimensional model of the target equipment item and a three-dimensional model of the target material item. However, there is no limitation on the specific process for generating a composite equipment item. In other embodiments, for example, the game system 1 may store therein in advance data for generating a three-dimensional model of a composite equipment item.

In the above-described example, the composition process is executed in the state where the game image, in which the player character 201 is placed on the game field, is displayed. However, there is no limitation on the timing to execute the composition process during the game. For example, during the game, the game system 1 may receive a composition instruction from the player and execute the composition process in response to the composition instruction, in the state where a list image showing a list of items possessed by the player character 201 is displayed. In this case, a target material item and a target equipment item may be designated by the player from the items included in the list image.

As described above, in the exemplary embodiment, a new composite equipment item can be generated by combining an equipment item and a material item. Thus, the number of items appearing in the game can be efficiently increased, whereby many types of items can be caused to appear in the game.

[2-2. Method for Generating Collision of Composite Equipment Item]

In the exemplary embodiment, for a composite equipment item generated as described above, an area (hereinafter, referred to as "collision") for performing collision determination between the composite equipment item and another object is set. Here, if the game system 1 stores therein in advance data regarding collisions of all the composite equipment items to be generated (e.g., data indicating the shapes, the sizes, etc., of the collisions), the game system should store therein the above data for all the combinations of the equipment items and the material items that can be composited with the equipment items, which results in an increase in the amount of data stored in the game system 1. The amount of data is likely to be enormous as the number of the combinations increases. Therefore, in the exemplary embodiment, when a composite equipment item has been generated, a collision to be set for the composite equipment item is newly generated. In this case, the game system 1 need not store therein the data of collisions of composite equipment items in advance, thereby reducing the amount of data stored in the game system 1. Hereinafter, a method for generating a collision of a composite equipment item will be described.

In the exemplary embodiment, the game system 1 generates a collision of a composite equipment item, based on a collision of an original material item and a collision of an original equipment item. In the following description, the collision of the material item is referred to as "material collision", the collision of the equipment item is referred to as "equipment collision", and the collision of the composite equipment item is referred to as "composite equipment collision". The material collision is a collision for performing collision determination regarding a material item when the material item is placed in a virtual game space. The equipment collision is a collision for performing collision determination regarding an equipment item when the equipment item is placed in the virtual game space (including a case where a character is equipped with the equipment item). The composite equipment collision is a collision for performing collision determination regarding a composite equipment item when the composite equipment item is placed in the virtual game space (including a case where a character is equipped with the composite equipment item). As described above, in the exemplary embodiment, using the collision of the original material item (i.e., the material collision), the collision of the composite equipment item after composition based on the material item (i.e., the composite equipment collision) can be generated.

In the exemplary embodiment, data regarding the material collision and the equipment collision (e.g., data defining the shapes and the sizes of the collisions) are prepared in advance. The data regarding these collisions have been stored in the game system 1 in advance (i.e., in advance of game processing) in the form of being included in the game program, for example.

If the composite equipment item is generated during the game, the game system 1 firstly generates a composition collision, based on the material collision. The composition collision is used for generating the composite equipment collision, and is generated from the material collision through a process described later. That is, in the exemplary embodiment, the game system 1 generates the composite equipment collision not by using the material collision as it is but by using the composition collision generated from the material collision. Thus, the number of apexes of the composite equipment collision can be restricted to not more than a certain number, thereby reducing the amount of data of the composite equipment collision, which will be described in detail later.

Figure 11:
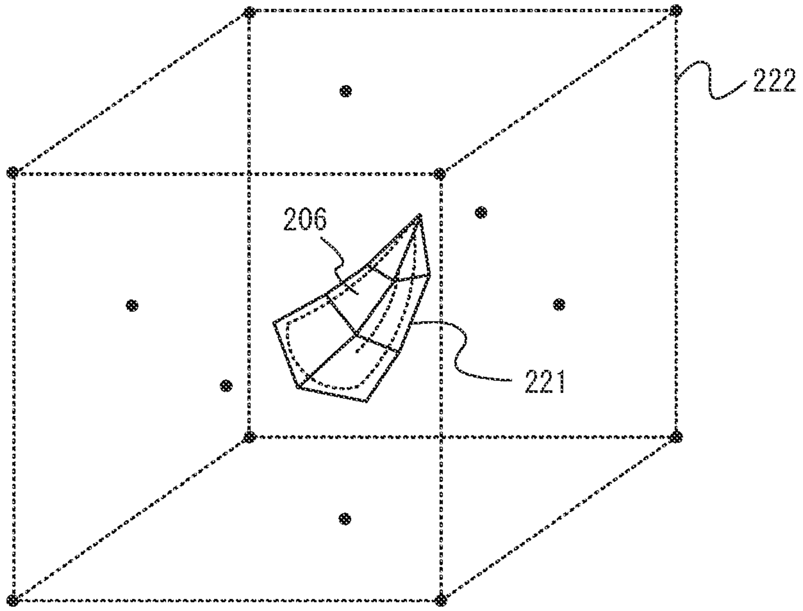
FIG. 11 shows an example of base points set around a material collision.

Hereinafter, a process of generating a composition collision will be described with reference to FIG. 11 to FIG. 14. When generating a composition collision, the game system 1 sets a plurality of base points around a material collision disposed in the virtual space. FIG. 11 shows an example of the base points set around the material collision. In FIG. 11, the base points set around a material collision 221 for the above-described tusk object 206 are represented by black dots.

The game system 1 firstly sets a reference area 222 including the material collision 221. In the exemplary embodiment, the reference area 222 is a rectangular parallelepiped. The reference area 222 is obtained by, for example, expanding a boundary box, which is set in contact with the surface of the material collision 221, to a size a prescribed number of times as large as the boundary box. The game system 1 places the reference area 222 such that the center of the reference area 222 is positioned at the center of the material collision 221.

The game system 1 sets a plurality of base points, based on the reference area 222. In the exemplary embodiment, the apexes of the reference area 222 being a rectangular parallelepiped and the center points in the planes of the reference area 222 are set as the base points (see FIG. 11). As shown in FIG. 11, in the exemplary embodiment, 14 base points are set based on the reference area 222 being a rectangular parallelepiped.

As described above, in the exemplary embodiment, the plurality of base points set outside the material collision are set at the positions of the apexes of the rectangular parallelepiped (i.e., the reference area 222) including the material collision and at the center positions in the planes of the rectangular parallelepiped. Thus, the base points can be set in balanced directions with respect to the material collision. Thus, the composition collision reflecting the shape of the material collision can be easily generated, which will be described in detail later.

In other embodiments, there is no limitation on the base point setting method. For example, the reference area may have any shape such as a spherical shape, an elliptical shape, or a capsular shape. Furthermore, for example, there is no limitation on the positions and the number of the base points. The base points may be set based on the reference area, according to any rule. For example, in other embodiments, base points may be set at only the positions of the apexes of the reference area. The game system 1 may set base points without using the reference area. For example, the game system 1 may set base points at positions a predetermined distance away, in a plurality of directions, from the center position of the material collision.

The game system 1 determines apexes of the composition collision, based on the plurality of base points set as described above. Specifically, the game system 1 firstly calculates, based on the base points, candidate points to be candidates for the apexes of the composition collision.

Figure 12:
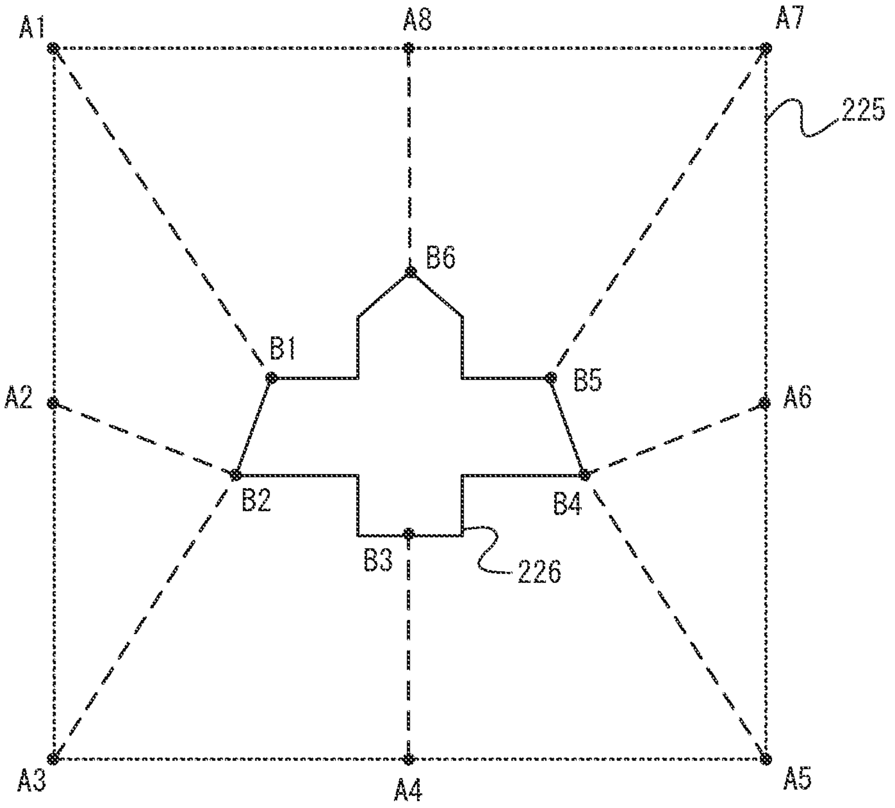
FIG. 12 shows an example of candidate points calculated based on the base points.

FIG. 12 shows an example of the candidate points calculated based on the base points. In the exemplary embodiment, in actuality, each collision has a three-dimensional shape, and the candidate points and the apexes of the composition collision are calculated in a three-dimensional virtual space. However, FIGS. 12 to 14 described below show an example of calculating the candidate points and the apexes of the composition collision in a two-dimensional plane, in order to make the figures easily viewable. That is, in FIG. 12, the apexes of a reference area 225 having a rectangular shape and the center points on the sides of the reference area 225 are set as base points A1 to A8. FIG. 12 shows an example in which candidate points B1 to B6 are calculated for a material collision 226 having a shape different from FIG. 11.

In the exemplary embodiment, a position closest to a base point in the area of the material collision is calculated as a candidate point. The game system 1 performs, for each base point, a process of calculating a position closest to the base point in the area of the material collision. The position of the candidate point may be the position of an apex of the material collision, or may be a position on a side or a plane of the material collision. In the example shown in FIG. 12, a candidate point for the base point A1 is the point B1 that is closest to the base point A1 in the area of the material collision 226. As for the base points A2 and A3, the point B2 in the area of the material collision 226 is a point closest to these base points. Therefore, the point B2 is the candidate point for each of the base points A2 and A3. Thus, a plurality of base points may have the same position that is closest to the base points in the area of the material collision. Like the base points A1 to A3, the point B3 is a candidate point for the base point A4, the point B4 is a candidate point for each of the base points A5 and A6, the point B5 is a candidate point for the base point A7, and the point B6 is a candidate point for the base point A8. Thus, 6 candidate points B1 to B6 are calculated based on 8 base points A1 to A8. As in the example shown in FIG. 12, if a plurality of base points have the same position that is closest to the base points in the area of the material collision, the number of the candidate points becomes less than the number of the base points.

As described above, in the exemplary embodiment, the game system 1 calculates the points (i.e., candidate points), on the material collision, closest to the respective base points. Then, a polyhedron having, as apexes, at least some of the closest points is set as a composition collision, which will be described in detail later. This allows the composition collision to have a shape reflecting the shape of the material collision. Moreover, in the exemplary embodiment, as shown in FIG. 11, the base points are set in balanced directions with respect to the material collision, whereby the shape of the composition collision is more likely to be a shape reflecting the shape of the material collision.

The method for calculating candidate points from base points is not limited to the above method, and any method may be adopted. For example, in other embodiments, the game system 1 may calculate, as a candidate point, a point of intersection between a line segment connecting a base point and the center of the material collision, and the surface of the material collision.

Figure 13:
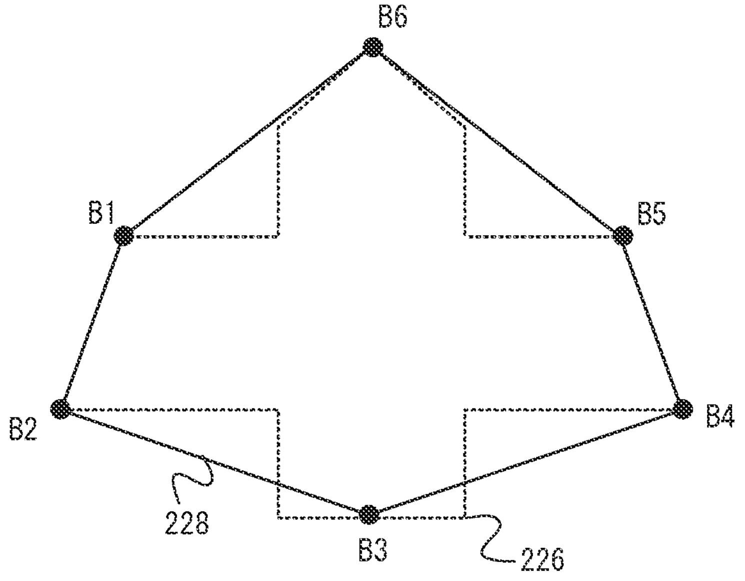
FIG. 13 shows an example of a composition collision generated based on the candidate points.

In the exemplary embodiment, the game system 1 sets, as a composition collision, a polyhedron having, as apexes, at least some of the plurality of candidate points calculated as described above. FIG. 13 shows an example of the composition collision generated based on the candidate points. FIG. 13 shows a composition collision 228 generated based on the candidate points B1 to B6 shown in FIG. 12. In the example shown in FIG. 13, the composition collision 228 has 6 apexes while the material collision 226 has 13 apexes. Thus, in the exemplary embodiment, the composition collision has such a shape that the number of apexes is restricted to not more than a certain number while reflecting the shape of the original material collision. Specifically, in the exemplary embodiment, since the number of base points is 14, the number of candidate points is 14 at maximum, resulting in that the number of apexes of the composition collision is restricted to 14 or less.

If the plurality of candidate points calculated as described above are used as they are as the apexes of the composition collision, the composition collision may have a shape with a depression. In this regard, in the exemplary embodiment, the game system 1 deletes, from the plurality of candidate points, a point corresponding to an apex that forms a depression (referred to as "apex of a depression") in the polyhedron having the candidate points as the apexes. Then, the remaining candidate points other than the deleted candidate point are set as the apexes of the composition collision. In the exemplary embodiment, the game system 1 deletes the apex of the depression as described above, thereby generating a composition collision that is a convex polyhedron having no depression.

Figure 14:
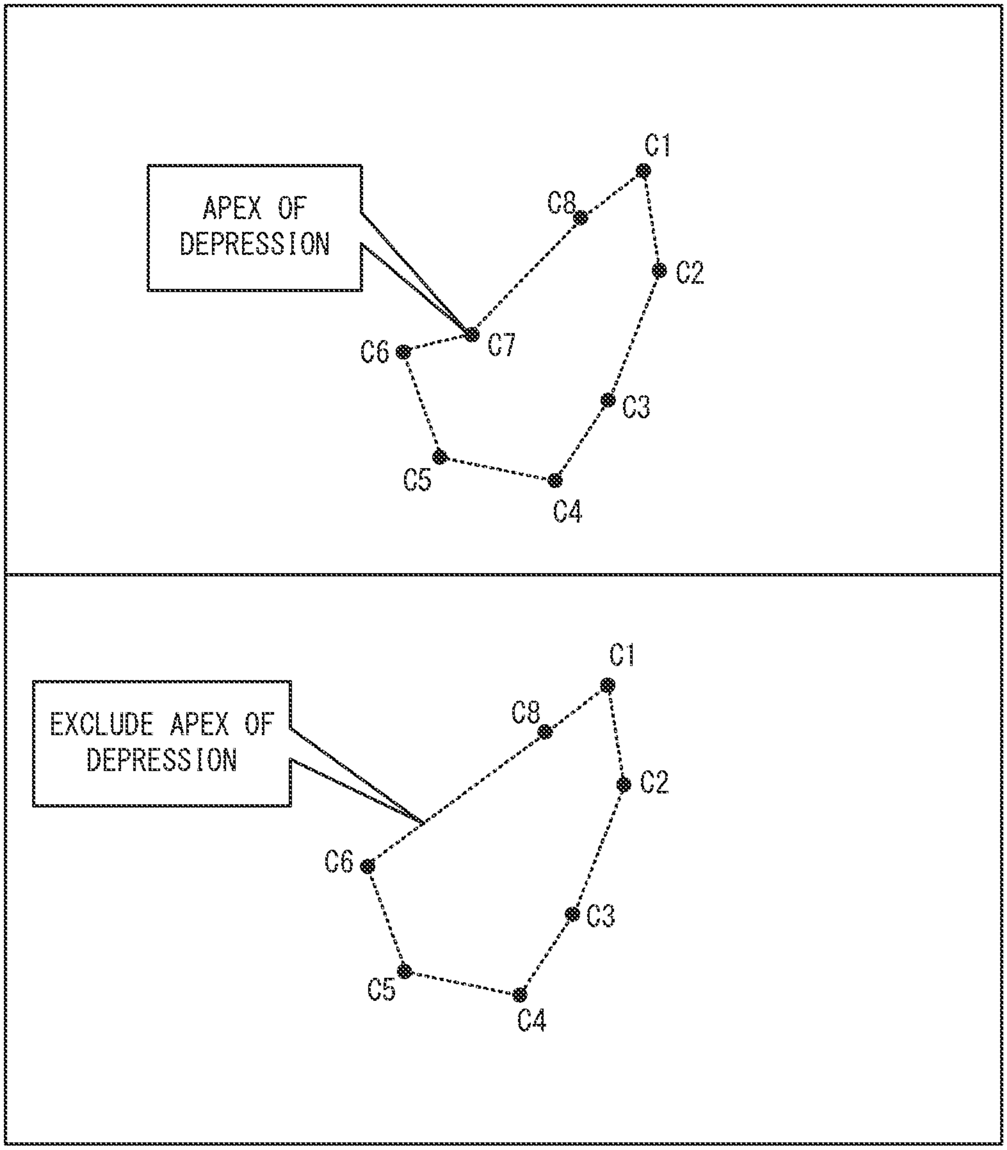
FIG. 14 shows an example in which some of a plurality of candidate points are deleted.

FIG. 14 shows an example in which some of a plurality of candidate points are deleted. In the example shown in FIG. 14, among 8 candidate points C1 to C8, the candidate point C7 is an apex of a depression. In this case, the game system 1 deletes the candidate point C7 being the apex of the depression, and sets the remaining candidate points C1 to C6 and C8 as the apexes of the composition collision. Therefore, in the example shown in FIG. 14, the composition collision having 7 candidate points C1 to C6 and C8 as the apexes is generated, and the composition collision has a convex shape.

If there is no apex of a depression among the plurality of candidate points, the game system 1 sets the candidate points as the apexes of the composition collision. For example, in the example shown in FIG. 12, since there is no apex of a depression among the calculated candidate points B1 to B6, the candidate points B1 to B6 become the apexes of the material collision.

As described above, in the exemplary embodiment, the game system 1 sets, as the shape of the composition collision, a convex polyhedron having at least some of a plurality of candidate points as the apexes. This inhibits the shape of the composition collision from being excessively complex, thereby inhibiting the shape of the composite equipment collision based on the composition collision from being excessively complex. Therefore, in the exemplary embodiment, a composite equipment collision having an appropriate shape can be generated as a collision used for a composite equipment item such as a weapon or a protective gear. Furthermore, in the exemplary embodiment, the game system 1 deletes a candidate point at a position that is not an apex of the convex polyhedron from among the plurality of candidate points, and sets, as the shape of the composition collision, the convex polyhedron having the remaining candidate points as the apexes. Thus, the composition collision having the convex shape can be easily generated.

Moreover, in the exemplary embodiment, the candidate points are calculated based on a certain number of (here, 14) base points, and the apexes of the composition collision are determined from among the candidate points. Therefore, in the exemplary embodiment, the number of apexes of the composition collision is not more than the certain number. That is, the game system 1 sets a polyhedron having not more than the certain number of apexes, as the composition collision, based on the shape of the material collision. This allows the number of apexes of the composition collision to be restricted to not more than the certain number without being affected by the number of apexes of the material collision, whereby the amount of data of the composition collision and the composite equipment collision can be reduced. For example, even when the material collision has a complex shape (e.g., a shape having many apexes), the number of apexes of the composition collision can be restricted to not more than the certain number. In the exemplary embodiment, the number of apexes of the composition collision can be restricted not only by setting the number of the base points, but also by excluding an apex of a depression from among the candidate points.

Figure 15:
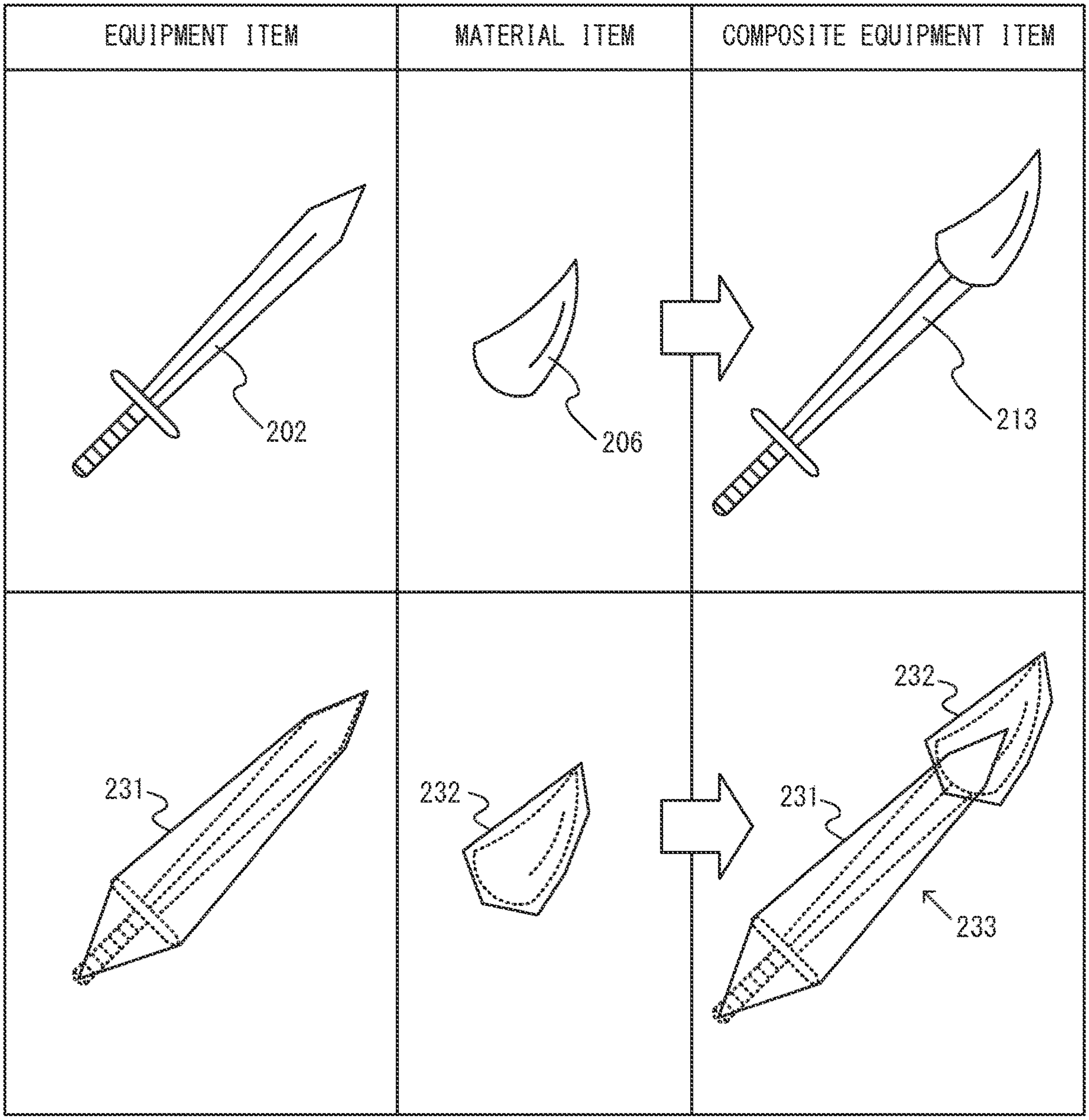
FIG. 15 shows an example of a composite equipment item, and a composite equipment collision of the composite equipment item.

In the exemplary embodiment, the composite equipment collision is generated based on the composition collision and the equipment collision generated as described above. FIG. 15 shows an example of a composite equipment item, and a composite equipment collision of the composite equipment item. FIG. 15 shows a composite equipment item 213 generated by compositing the sword object 202 and the tusk object 206 described above, and a composite equipment collision 233 for the composite equipment item 213.

In the exemplary embodiment, the appearance of the composite equipment item includes at least a part of the appearance of the original equipment item, and a part of the appearance of the original material item. In the example shown in FIG. 15, the appearance of the composite equipment item 213 includes a part of the appearance of the sword object 202 (specifically, a part except the tip), and the appearance of the tusk object 206. More specifically, the composite equipment item 213 has an appearance in which the tusk object 206 is attached to the tip of the sword object 202. Any method for generating a 3D model of a composite equipment item may be adopted as long as the 3D model of the composite equipment item 213 shown in FIG. 15 consequently has the appearance as described above. The 3D model of the composite equipment item may be a combination of the 3D model of the equipment item and the 3D model of the material item, or may be a single model different from the 3D model of the equipment item and the 3D model of the material item.

Meanwhile, the composite equipment collision is generated by combining the composition collision and the equipment collision. Specifically, the game system 1 superposes the composition collision and the equipment collision in a predetermined positional relationship such that an area within the area of either the composition collision or the equipment collision is the composite equipment collision. That is, in the exemplary embodiment, the area of the composite equipment collision is a union of the area of the composition collision and the area of the equipment collision. Thus, the composite equipment collision can be easily generated based on the composition collision and the equipment collision.

In the exemplary embodiment, the positional relationship, in which the composition collision and the equipment collision are superposed one upon another, is set such that the shape of the composite equipment collision corresponds to the appearance of the composite equipment item. For example, in the example shown in FIG. 15, the composite equipment item 213 has an appearance in which the tusk object 206 is attached to the tip of the sword object 202. Therefore, the game system 1 generates the composite equipment collision 233 by superposing the equipment collision 231 corresponding to the sword object 202 and the composition collision 232 corresponding to the tusk object 206 in such a positional relationship that the latter is disposed at the tip of the former (see FIG. 15).

As described above, in the exemplary embodiment, the game system 1 generates the 3D model of the composite equipment item as a model in which a material item is attached to the tip of an equipment item. In addition, the game system 1 generates the composite equipment collision as the shape in which the composition collision is disposed at the tip of the equipment collision. Thus, the composite equipment collision having a shape matching the appearance of the composite equipment item can be generated. The "model in which the material item is disposed at the tip of the equipment item" may be any model having such an appearance that the material item is disposed at the tip of the equipment item. That is, the above model is not limited to a model obtained by combining two models, i.e., the model of the material item with the model of the equipment item, and may be a single model having the appearance as described above.

A 3D model of a composite equipment item having an appearance in which a blade part of a sword object being an equipment item is replaced with the appearance of a material item (see FIG. 17) described later is also an example of the "model in which the material item is disposed at the tip of the equipment item". Although described in detail layer, also for such a composite equipment item, a composite equipment collision is generated so as to have a shape in which a composition collision is disposed at the tip of an equipment collision (in the example shown in FIG. 17 described later, an equipment collision that is transformed by deleting some apexes).

For example, if the equipment item is a shield, the composite equipment item may have an appearance in which the material item is attached to the front surface of the shield. For example, if the equipment item is an arrow object, the composite equipment item may have an appearance in which a head part of the arrow is replaced with the appearance of the material item. The models of the shield object and the arrow object, each having been composited as described above, can also be regarded as examples of the "model in which the material item is disposed at the tip of the equipment item". Also, in these cases, the composite equipment collision is generated so as to have a shape in which the composition collision is disposed at the tip of the equipment collision.

The appearance of the composite equipment item is not limited to the appearance in which the material item is attached to the tip of the equipment item. The composite equipment item may have any appearance. Regardless of the appearance of the composite equipment item, the game system 1 can generate a composite equipment collision that matches the appearance of the composite equipment item by superposing the composition collision and the equipment collision in such a positional relationship that the shape of the composite equipment collision corresponds to the appearance of the composite equipment item.

In the exemplary embodiment, the positional relationship in which the composition collision and the equipment collision are superposed one upon another has been determined in advance for each combination of a material item and an equipment item. For example, the positional relationship is determined in the game program. That is, in the exemplary embodiment, the appearance of the composite equipment item (i.e., the positional relationship, in appearance, between the equipment item part and the material item part of the composite equipment item) has been determined in advance, and the positional relationship for superposing the composition collision and the equipment collision has also been determined in advance so as to conform to the appearance of the composite equipment item. However, in other embodiments, the game system 1 may calculate the positional relationship during the game (e.g., at the time of generating the composite equipment item), and may generate the composite equipment collision, based on the calculated positional relationship. For example, in other embodiments, in the case of generating the model of the composite equipment item by combining the model of the equipment item and the model of the material item in the positional relationship that is variably determined according to a predetermined condition, the game system 1 may generate the composite equipment collision by superposing the composition collision and the equipment collision in the same positional relationship as that for the combined two models.

In the exemplary embodiment, the equipment collision has been determined in advance as a convex polyhedron for each equipment item. In addition, as described above, the composition collision is generated to be a convex polyhedron. Thus, in the exemplary embodiment, the equipment collision and the composition collision each are a convex polyhedron. That is, in the exemplary embodiment, the equipment collision and the composition collision each are an appropriate shape as a collision used for the composite equipment item such as a weapon or a protective gear. Since the composite equipment collision is generated by using the equipment collision and the composition collision, the composite equipment collision having an appropriate shape can be easily generated. In other embodiments, the equipment collision and the composition collision may not necessarily have convex shapes.

Figure 16:
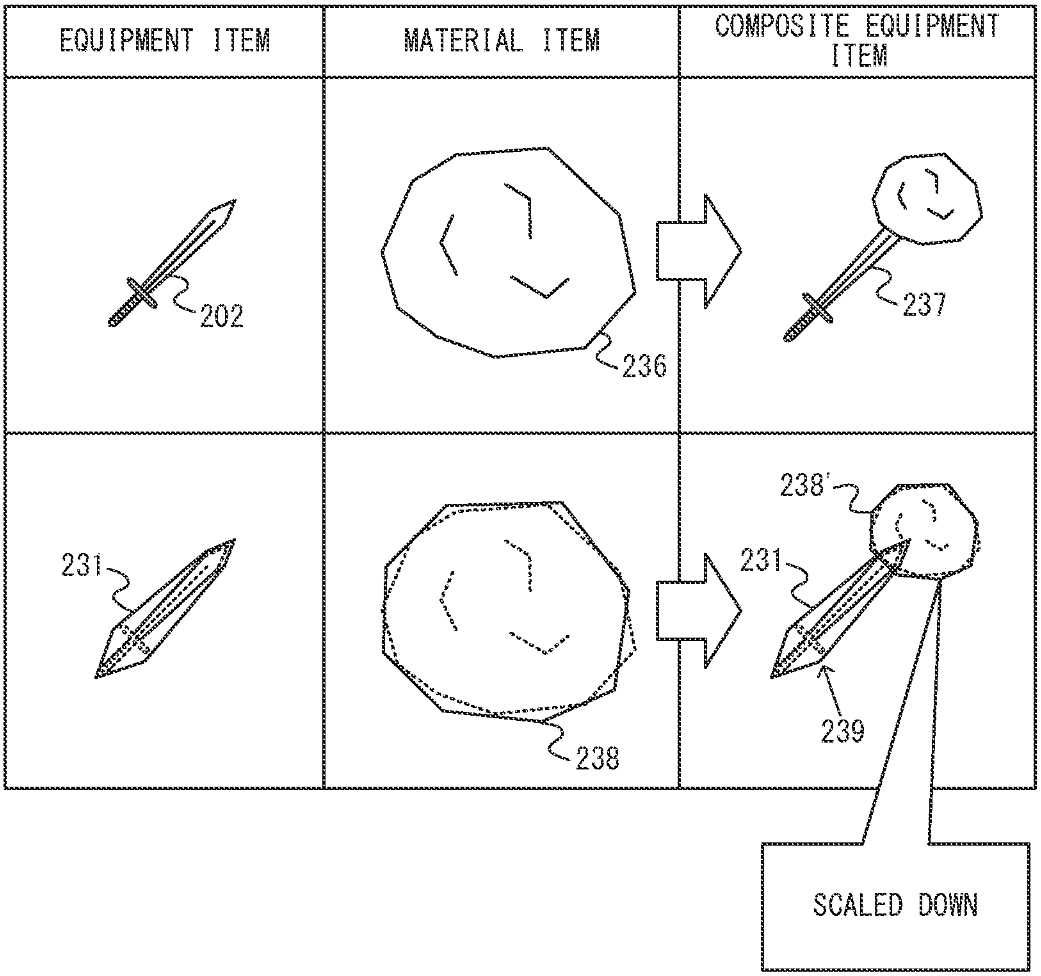
FIG. 16 shows an example in which the size of a material item is different from the size of a material part of the composite equipment item.

In the exemplary embodiment, a part (referred to as "material part"), of the composite equipment item, which represents the material item may have a size different from the size of the original material item. FIG. 16 shows an example in which the size of the material item is different from the size of the material part of the composite equipment item. FIG. 16 shows an example in which a composite equipment item 237 is generated by compositing the sword object 202 and a rock object 236. In the example shown in FIG. 16, since the rock object 236 as a material item is larger than the sword object 202, the appearance of the composite equipment item 237 is not an appearance in which the rock object 236 having the original size is attached to the tip of the sword object 202, but an appearance in which a rock smaller than the rock object 236 is attached to the tip of the sword object 202. Thus, when the material item is larger than the equipment item, the composite equipment item may have an appearance in which the material part representing the material item is smaller than the original material item. If the material item is smaller than the equipment item, the composite equipment item may have an appearance in which the material part is larger than the original material item.

As described above, when the size of the material part of the composite equipment item is different from the size of the original material item, the game system 1 performs scaling on the composition collision. That is, the game system 1 adjusts the size of the composition collision generated as described above. In the example shown in FIG. 16, since the size of the material part of the composite equipment item 237 is smaller than the size of the rock object 236, the game system 1 performs scaling to reduce the size of a composition collision 238 corresponding to the rock object 236, and superposes the scaled composition collision 238' on the equipment collision 231 to generate a composite equipment collision 239.

Specifically, the game system 1 changes the size of the composition collision according to the ratio of the size of the original material item to the size of the material part of the composite equipment item. For example, when the size of the material part of the composite equipment item is x times as large as the size of the original material item, the size of the composition collision is multiplied by x (x: positive value). Since the composition collision before the scaling has substantially the same size as the material item, the scaling performed as described above allows the composition collision after the scaling to have substantially the same size as the material part of the composite equipment item.

In the exemplary embodiment, the size of the material part of the composite equipment item has been determined in advance for each material item. For example, the size has been determined in the game program. The game system 1 determines a scaling ratio so as to conform to the predetermined appearance of the composite equipment item. There is no limitation on the specific method for determining a scaling ratio. In other embodiments, the game system 1 may determine the size of the material part of the composite equipment item so as to be variable according to a predetermined condition, and may generate the composite equipment item according to the determined size. In this case, the game system 1 may calculate the scaling ratio such that the composition collision has a size corresponding to the calculated size of the material part.

As described above, in the exemplary embodiment, the game system 1 generates the composite equipment collision by scaling the composition collision. Thus, even when the size of the material part of the composite equipment item is different from the size of the original material item, a composite equipment collision having a shape corresponding to the appearance of the composite equipment item can be generated. In other embodiments, scaling on the composition collision may not necessarily be performed.

In the exemplary embodiment, the game system 1 performs scaling on the composite equipment collision. In other embodiments, scaling may be performed on the material collision before generation of the composition collision. That is, the game system 1 may perform scaling on the material collision, and generate the composition collision based on the material collision after the scaling. In the method of performing scaling on the material collision, if the material collision has a complex shape or the like, the shape of the material collision may be deformed due to the scaling, and the material collision after the scaling may have a shape that does not match the shape of the material item. Also, the composition collision generated based on the material collision may have a shape that does not match the shape of the material item. Meanwhile, in the exemplary embodiment, since scaling is performed after generation of the composition collision, the possibility that the shape of the composition collision does not match the shape of the material item due to the scaling, can be reduced.

As described above, in the exemplary embodiment, the composite equipment item may have an appearance in which the blade part of the equipment item is replaced with the material item, depending on the type of the material item. In this case, the game system 1 transforms the equipment collision, and generates the composite equipment collision, based on the transformed equipment collision. Hereinafter, an example of the case where the composite equipment collision is generated based on the transformed equipment collision, will be described.

Figure 17:
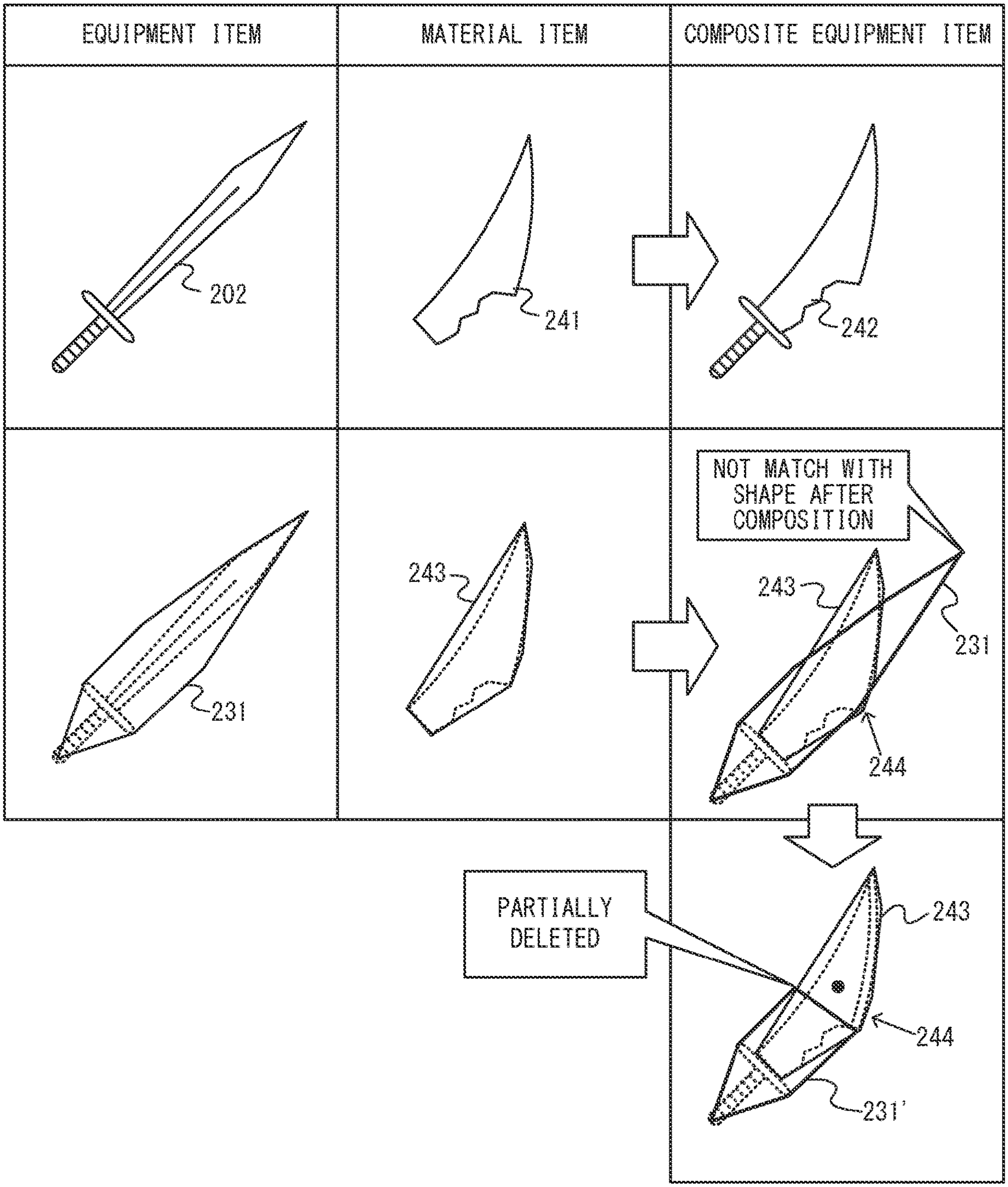
FIG. 17 shows an example of generating a composite equipment item having an appearance in which a blade part of an equipment item is replaced with a material item.

FIG. 17 shows an example of the case where the composite equipment item having an appearance in which the blade part of the equipment item is replaced with the material item, is generated. In the example shown in FIG. 17, the sword object 202 and a horn object 241 are composited to generate a composite equipment item 242 having an appearance in which the blade part of the sword is replaced with the horn object 241.

Here, if the composite equipment collision is generated by simply superposing the composition collision and the equipment collision, there is a possibility that the shape of the composite equipment collision does not match the appearance of the composite equipment item. For example, in the example shown in FIG. 17, since the shape and size of the blade of the composite equipment item 242 are different from those of the blade of the sword object 202, if the equipment collision 231 of the sword object 202 is used as it is, a composite equipment collision 244 having a shape extending up to a position where the blade of the composite equipment item 242 does not exist, is generated (see FIG. 17). As a result, the shape of the composite equipment collision 244 does not match the appearance of the composite equipment item 242.

Meanwhile, in the exemplary embodiment, when the composite equipment item has the appearance in which the blade part of the equipment item is replaced with the material item, the game system 1 transforms the equipment collision. Specifically, the game system 1 deletes a part, on the tip side, of the equipment collision, and superposes the equipment collision after the deletion on the composition collision to generate the composite equipment collision. In the example shown in FIG. 17, out of the apexes of the equipment collision 231, apexes that are positioned on the tip side relative to a center point (black dot in FIG. 17) of a composition collision 243, are deleted. The game system 1 superposes an equipment collision 231' after the deletion of the apexes, on the composition collision 243, thereby generating the composite equipment collision 244. Thus, the composite equipment collision 244 has a shape matching the appearance of the composite equipment item 242 (see FIG. 17).

In the above example, the equipment collision is transformed by deleting the apexes positioned on the tip side relative to the center of the composition collision, but there is no limitation on the specific method for transforming the equipment collision. In other embodiments, the equipment collision may be transformed independently of the composition collision. For example, the game system 1 may transform the equipment collision so as to delete a predetermined part (e.g., a part corresponding to the blade of the equipment item) of the equipment collision.

As described above, in the exemplary embodiment, if the material item is a predetermined type of item, the game system 1 replaces the equipment collision with a collision having a different shape when generating the composite equipment item. Specifically, the game system 1 deletes at least a part, on the tip side, of the equipment collision to generate the composite equipment collision. This allows the composite equipment collision to have a shape matching the appearance of the composite equipment item.

In the exemplary embodiment, whether or not to transform the equipment collision is determined based on the type of the material item. In other embodiments, whether or not to transform the equipment collision may be determined based on the type of the equipment items, or based on the combination of the equipment item and the material item. For example, in other embodiments, the composite equipment item may be made to have an appearance in which the blade part of the equipment item is replaced with the material item, on the condition that the type of the equipment item is a predetermined type. In this case, the game system 1 transforms the equipment collision when the type of the equipment item is the predetermined type. Meanwhile, the composite equipment item may be made to have an appearance in which the blade part of the equipment item is replaced with the material item, on the condition that the combination of the equipment item and the material item is a predetermined combination. In this case, the game system 1 transforms the equipment collision when the combination of the equipment item and the material item is the predetermined combination.

3. Specific Example of Processing in Game System

Next, a specific example of information processing in the game system 1 will be described with reference to FIGS. 18 to 21.

Figure 18:
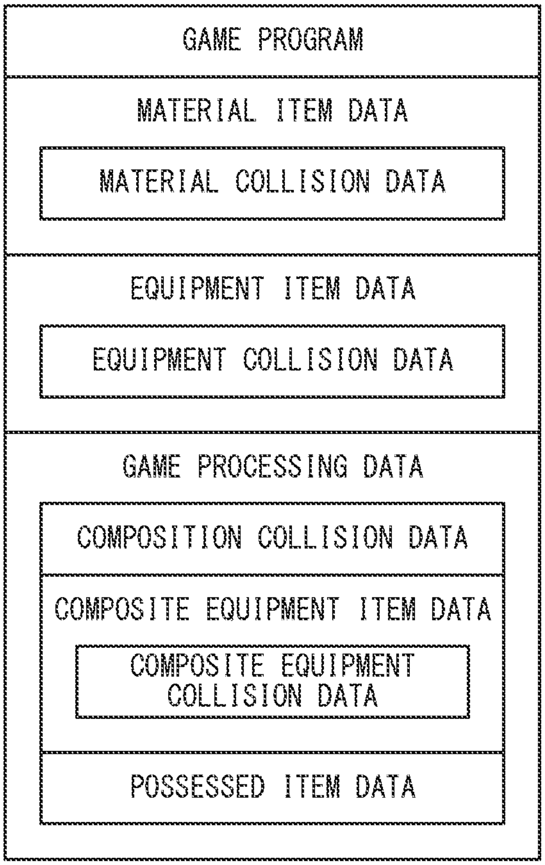
FIG. 18 shows an example of various types of data used for information processing in a non-limiting game system.

FIG. 18 shows an example of various types of data used for the information processing in the game system 1. The various types of data shown in FIG. 18 are stored in a storage medium (e.g., the flash memory 84, the DRAM 85, and/or the memory card attached to the slot 23) accessible by the main body apparatus 2.

As shown in FIG. 18, the game system 1 stores therein a game program. The game program is a game program for executing the game processing (specifically, the processes shown in FIGS. 19 to 21) of the exemplary embodiment.

Furthermore, the game system 1 stores therein material item data and equipment item data. These data are prepared in advance, and are stored in the game system 1 together with the game program (or so as to be included in the game program), for example.

The material item data includes various data regarding a material item, and is stored for each material item. In the exemplary embodiment, the material item data includes data of a material collision of the material item (e.g., data indicating the shape and the size of the material collision). Moreover, although not shown in FIG. 18, the material item data includes data of a 3D model of the material item, data indicating the property of the material item, and the like.

The equipment item data includes various data regarding an equipment item, and is stored for each equipment item. In the exemplary embodiment, the equipment item data includes data of an equipment collision of the equipment item (e.g., data indicating the shape and the size of the equipment collision). Moreover, although not shown in FIG. 18, the equipment item data includes data of a 3D model of the equipment item, data indicating the performance of the equipment item, and the like.

Furthermore, the game system 1 stores therein composition collision data, composite equipment item data, and possessed item data, as game processing data to be generated and used during the game processing. These data are stored in a memory (e.g., the DRAM 85) used for the game processing. These data are stored in the memory at an appropriate timing after the start of the game, and are appropriately updated according to the progress of the game.

The composition collision data indicates the shape and the size of the above-described composition collision. The composite equipment item data includes various data regarding a composite equipment item, and is stored for each generated composite equipment item. In the exemplary embodiment, the composite equipment item data includes composite equipment collision data indicating the shape and the size of the above-described composite equipment collision. The composite equipment item data may include, in addition to the composite equipment collision data, data of a 3D model of the composite equipment item, data indicating the performance of the composite equipment item, and the like. The possessed item data indicates items (e.g., material items, equipment items, composite equipment items, etc.) possessed by the player character.

Figure 19:
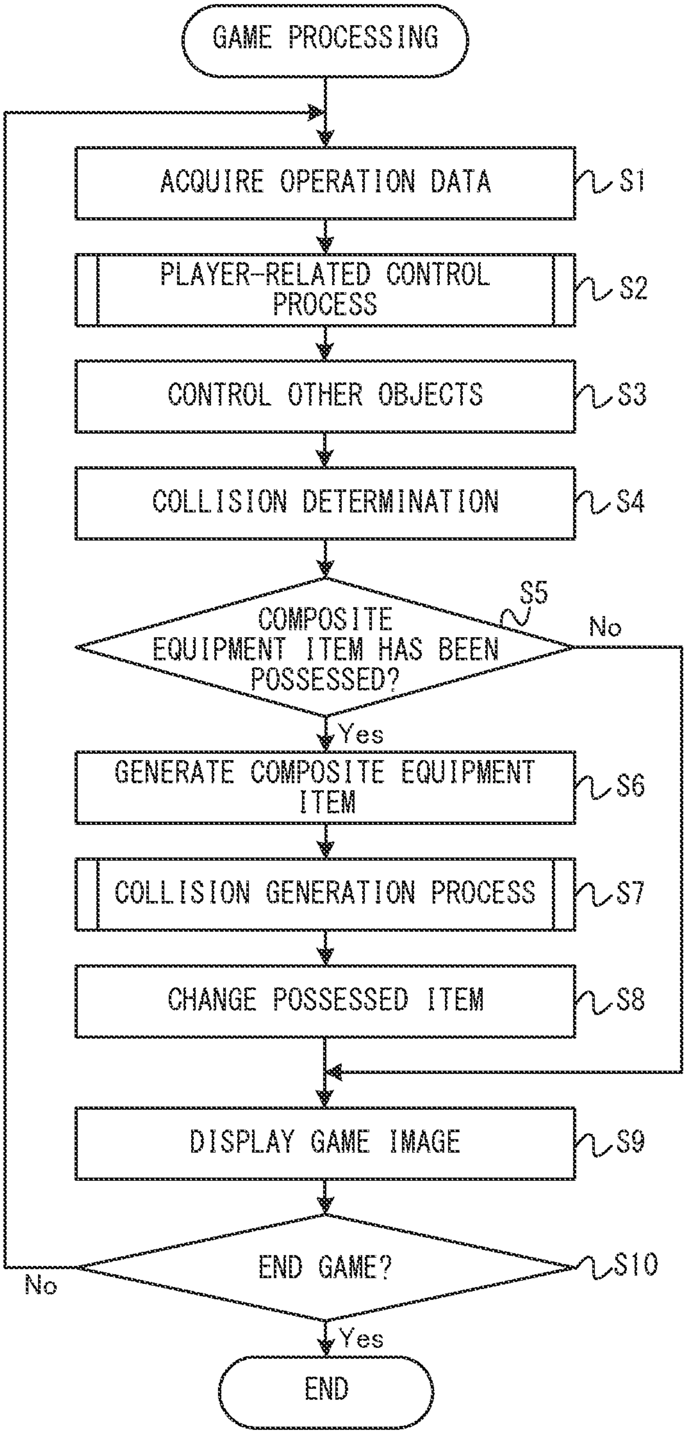
FIG. 19 is a flowchart showing an example of a flow of game processing executed by the non-limiting game system.

FIG. 19 is a flowchart showing an example of a flow of game processing executed by the game system 1. For example, the game processing shown in FIG. 19 is started according to that the player character is placed on the game field as the game is started.

In the exemplary embodiment, the processor 81 of the main body apparatus 2 executes the game program stored in the game system 1, thereby executing processes in steps shown in FIG. 19, and FIGS. 20 and 21 described later. However, in other embodiments, some of the processes in the steps may be executed by a processor (e.g., a dedicated circuit) other than the processor 81. When the game system 1 is communicable with another information processing apparatus (e.g., a server), some of the processes in the steps shown in FIGS. 19 to 21 may be executed by the another information processing apparatus. The processes in the steps shown in FIGS. 19 to 21 are merely examples, and as long as the same result is obtained, the order of the processes in the respective steps may be changed, or another process may be executed in addition to (or instead of) the process in each step.

Figure 20:
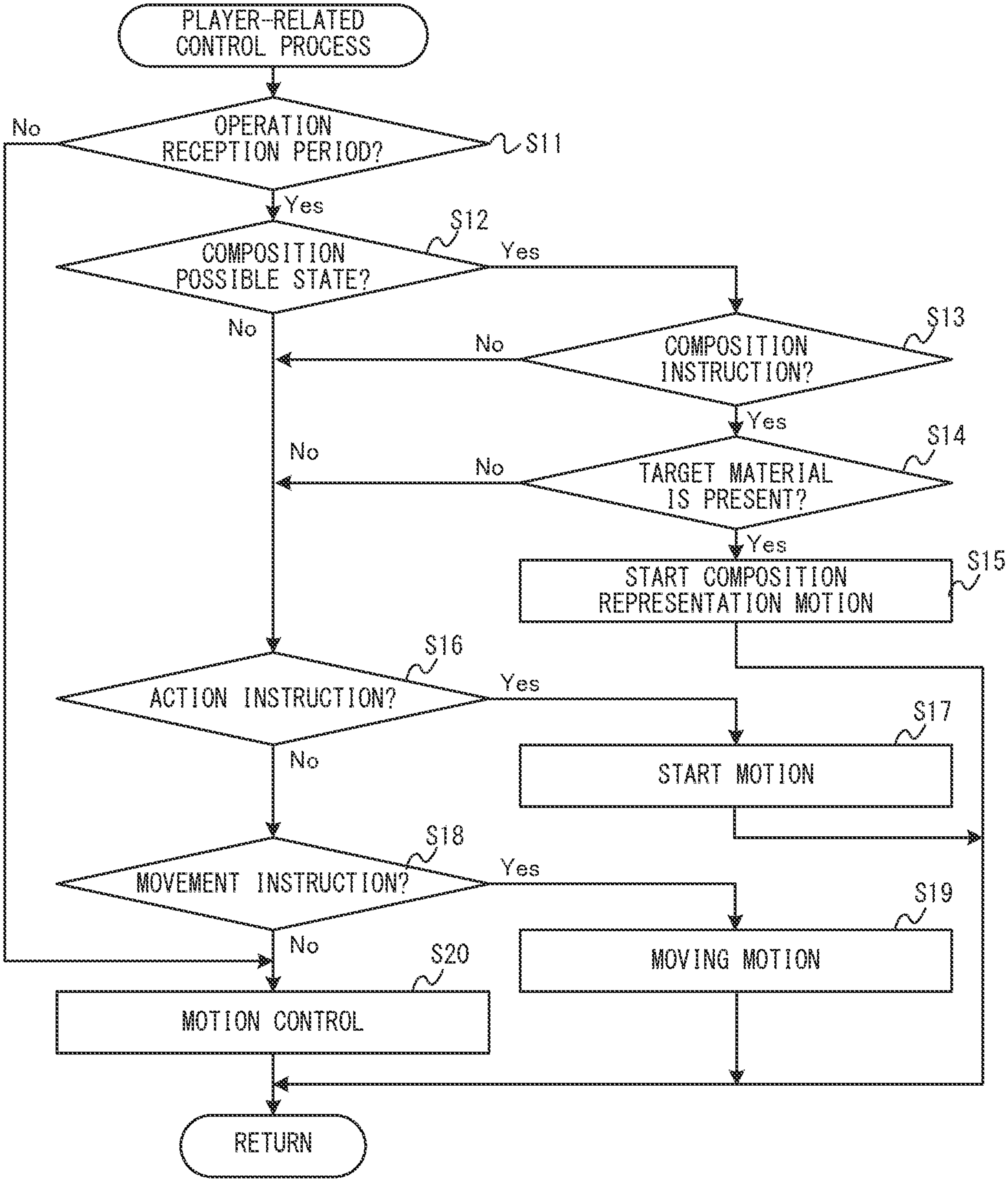
FIG. 20 is a sub flowchart showing an example of a specific flow of a player-related control process in step S2 shown in FIG. 19.
Figure 21:
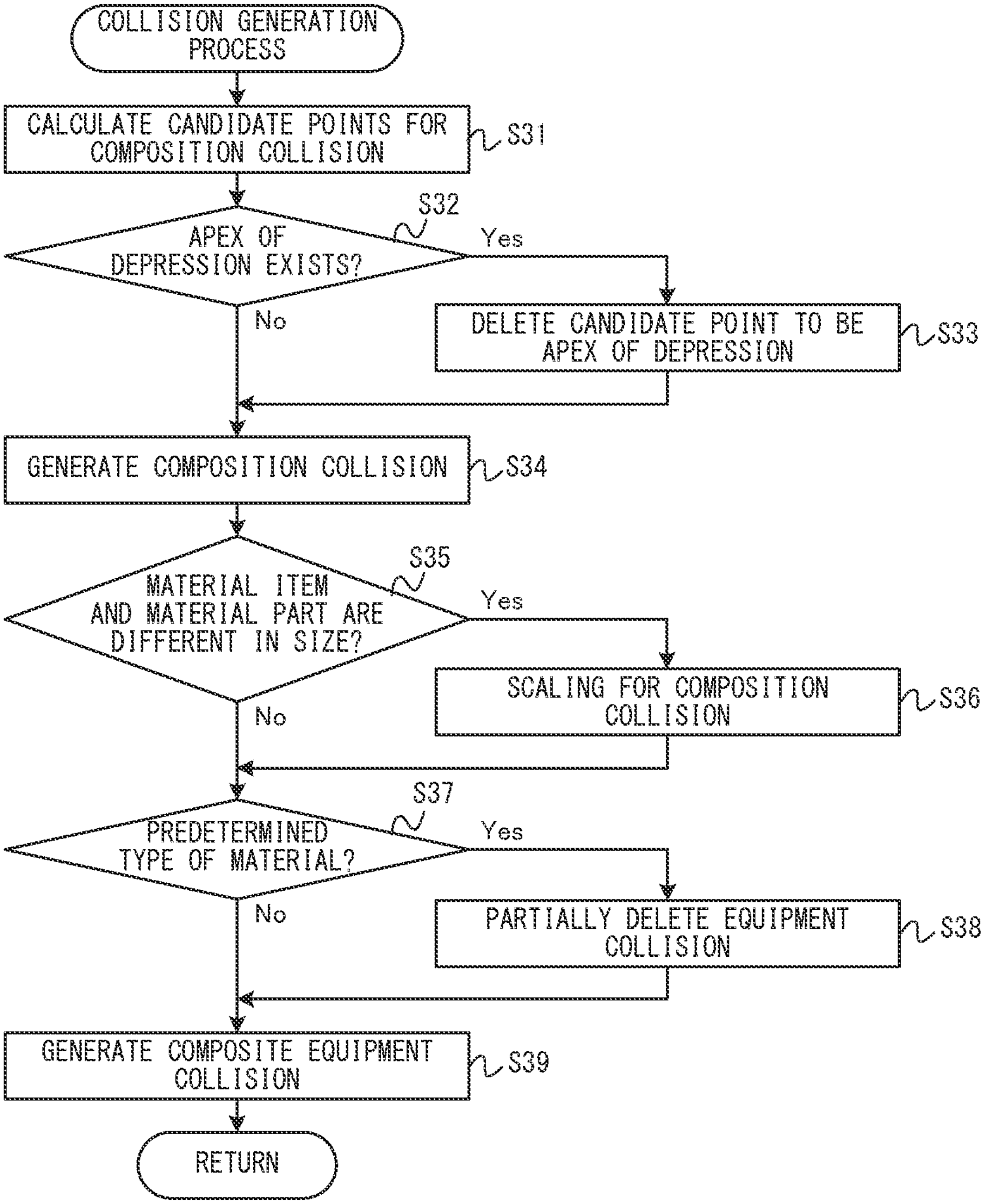
FIG. 21 is a sub flowchart showing an example of a specific flow of a collision generation process in step S7 shown in FIG. 19.

The processor 81 executes the processes in the steps shown in FIGS. 19 to 21 by using a memory (e.g., the DRAM 85). That is, the processor 81 stores information (in other words, data) obtained in each process step into the memory, and reads out the information from the memory when using the information for the subsequent process steps.

In step S1 shown in FIG. 19, the processor 81 obtains the operation data indicating an instruction by the player. That is, the processor 81 obtains the operation data that is received from each controller via the controller communication section 83 and/or the terminal 17 or 21. Next to step S1, the process in step S2 is executed.

In step S2, the processor 81 executes a player-related control process. In the player-related control process, various types of processes (e.g., a control process related to the player character) are executed based on an operation input performed by the player. Hereinafter, the player-related control process will be described in detail with reference to FIG. 20.

FIG. 20 is a sub flowchart showing an example of a specific flow of the player-related control process in step S2 shown in FIG. 19. In the player-related control process, firstly, in step S11, the processor 81 determines whether or not it is an operation reception period during which an operation input to the player character can be received. In the exemplary embodiment, a motion period during which an object such as the player character performs a predetermined motion (e.g., a motion started in step S15 or S17 described later) in response to an operation input to the player character, is excluded from the operation reception period. When the determination result in step S11 is positive, the process in step S12 is executed. When the determination result in step S11 is negative, the process in step S20 described later is executed.

In step S12, the processor 81 determines whether or not the player character is in the composition possible state. The determination in step S12 is performed according to whether or not the player character can use a specific item for performing composition. For example, during the game, the player character may be controlled to be able to use any of a plurality of types of items including the specific item. In this case, the processor 81 determines that the player character is in the composition possible state if the player character is able to use the specific item, and determines that the player character is not in the composition possible state if the player character is able to use an item other than the specific item. When the determination result in step S12 is positive, the process in step S13 is executed. When the determination result in step S12 is negative, the process in step S16 described later is executed.

In step S13, based on the operation data obtained in step S1, the processor 81 determines whether or not an operation input for the composition instruction described above has been performed. As described above, in the exemplary embodiment, the composition instruction is an instruction to designate a target equipment item from among the options indicated by the equipment designation image described above (see FIG. 9). When the determination result in step S13 is positive, the process in step S14 is executed. When the determination result in step S13 is negative, the process in step S16 described later is executed.

In step S14, the processor 81 determines whether or not the target material item to be a target of composition is present in the vicinity of the player character. Specifically, the processor 81 determines whether or not a material item is present within the determination range based on the position and the orientation of the player character. When the determination result in step S14 is positive, the process in step S15 is executed. When the determination result in step S14 is negative, the process in step S16 described later is executed.

In step S15, the processor 81 causes a representation motion to start when compositing the target material item and the target equipment item. As described above, the representation motion for composition according to the exemplary embodiment is a series of motions in which the target material item is attracted toward the player character, and after the target material item has come close to the player character, the target equipment item that the player character is equipped with is changed to the composite equipment item. After the representation motion has started in step S15, the respective items are controlled to perform the representation motion over a predetermined period, according to a process in step S20 described later. After step S15, the processor 81 ends the player-related control process shown in FIG. 20.

In step S16, based on the operation data obtained in step S1, the processor 81 determines whether or not an operation input for an action instruction to the player character has been performed. The action instruction is an instruction for causing the player character to perform, for example, an attack motion, a jump motion, a motion of picking up an item on the game field, or the like. When the determination result in step S16 is positive, the process in step S17 is executed. When the determination result in step S16 is negative, the process in step S18 is executed.

In step S17, the processor 81 causes the player character to start a motion according to the action instruction performed in step S16. After the player character has started the motion in step S17, the player character is controlled to perform the motion over a predetermined period, according to the process in step S20 described later. After step S17, the processor 81 ends the player-related control process shown in FIG. 20.

In step S18, based on the operation data obtained in step S1, the processor 81 determines whether or not an operation input for a movement instruction to the player character has been performed. The movement instruction is an instruction for causing the player character to move on the game field. When the determination result in step S18 is positive, the process in step S19 is executed. When the determination result in step S18 is negative, the process in step S20 is executed.

In step S19, the processor 81 causes the player character to move on the field according to the movement instruction performed in step S18. After step S19, the processor 81 ends the player-related control process shown in FIG. 20.

In step S20, the processor 81 controls each object (specifically, the player character and the material item) so as to perform various types of motions such as a progress of the motion started in step S15 or S17, and a motion to be performed when there is no input by the player. In step S20 for the first time, the processor 81 controls each object to progress the motion for one-frame time. The process in step S20 being repeatedly executed over a plurality of frames allows each object to perform a series of motions according to the composition instruction or the action instruction.

If a motion that the player character should perform is not instructed by the player (e.g., if the motion started in step S15 or S17 has already ended), the processor 81, in step S20, need not cause the player character to perform a motion, or may cause the player character to perform a motion (e.g., looking around, or swinging) that makes the behavior of the player character natural. After step S20, the processor 81 ends the player-related control process shown in FIG. 20.

Referring back to FIG. 19, in step S3, the processor 81 controls the motions of objects (e.g., an enemy character, an object placed in the game space, etc.) other than the player character. For example, as for an enemy character, the processor 81 controls the motion of the enemy character according to an algorithm prescribed in the game program. For example, as for an object (including a material item) placed in the game space, the processor 81 moves the object according to a result of collision determination described later (more specifically, a processing result in step S4 executed in the previous processing loop of steps S1 to S8). In one step S3, the processor 81 controls each object to progress the motion for one-frame time. Next to step S3, the process in step S4 is executed.

In step S4, the processor 81 performs collision determination for the respective objects, based on the results of the motions in steps S2 and S3. The "respective objects" include, in addition to the player character and the enemy character, objects such as items placed in the game space. Here, as for a material item, the processor 81 reads out material collision data stored in the memory, and performs collision determination by using a material collision indicated by the material collision data. As for an equipment item, the processor 81 reads out equipment collision data stored in the memory, and performs collision determination by using an equipment collision indicated by the equipment collision data. As for a composite equipment item, the processor 81 reads out composite equipment collision data stored in the memory, and performs collision determination by using a composite equipment collision indicated by the composite equipment collision data. Next to step S4, the process in step S5 is executed.

The result of the collision determination in step S4 is reflected in, for example, a motion control process for each object in the next frame (i.e., the processes in steps S2 and S3 in the next processing loop of steps S1 to S8). For example, if it is determined in step S4 that an equipment item of an enemy character hits the player character (i.e., the player character is attacked by the enemy character), the player character is controlled to perform a motion for a reaction against the attack (e.g., bending its body backward) in step S2 to be executed next. Specifically, in step S11 during the process in step S2, the processor 81 determines that it is not the operation reception period. Then, in the process in step S20, the processor 81 controls the player character to perform a motion for a reaction against the attack. For example, if it is determined that an item object (e.g., a material item, an equipment item, a composite equipment item, etc.) placed in the game space is hit by another object, the processor 81, in step S3 to be executed next, performs a control to move the item object, for example.

In step S5, the processor 81 determines whether or not a composite equipment item is newly possessed by the player character. For example, when a composition representation motion has been stated in response to a composition instruction performed by the player (step S15) or when the player character has picked up a composite equipment item in response to an action instruction performed by the player (step S17), the processor 81 determines that a composite equipment item is newly possessed by the player character. When the determination result in step S5 is positive, the process in step S6 is executed. When the determination result in step S5 is negative, the processes in steps S6 to S8 are skipped, and the process in step S9 is executed.

In step S6, the processor 81 generates a 3D model of the composite equipment item that is newly possessed by the player character. Specifically, the processor 81 reads out model data of the target material item and model data of the target equipment item from the storage medium of the game system 1, and generates a 3D model of the composite equipment item by using the read model data. Data of the generated 3D model of the composite equipment item is stored in the memory, as the composite equipment item data. Moreover, the processor 81 reads out material item data of the target material item and equipment item data of the target equipment item from the storage medium of the game system 1, and sets the property of the composite equipment item by using the read data. Data indicating the set property of the composite equipment item is stored in the memory, as the composite equipment item data. Next to step S6, the process in step S7 is executed.

In step S7, the processor 81 executes a collision generation process regarding the generated composite equipment item. The collision generation process is a process for generating a composite equipment collision of the composite equipment item. Hereinafter, the collision generation process will be described in detail with reference to FIG. 21.

FIG. 21 is a sub flowchart showing an example of a specific flow of the collision generation process in step S7 shown in FIG. 19. In the collision generation process, first, in step S31, the processor 81 calculates candidate points for generating a composition collision. That is, the processor 81 calculates a plurality of candidate points for a material collision of the original material item of the composite equipment item generated in step S6, according to the method described in the above "[2-2. Method for generating collision of composite equipment item]" (see FIG. 12). The processor 81 stores data indicating the calculated candidate points into the memory. Next to step S31, the process in step S32 is executed.

In step S32, the processor 81 determines whether or not there is a candidate point to be an apex of a depression, among the candidate points calculated in step S31. When the determination result in step S32 is positive, the process in step S33 is executed. When the determination result in step S32 is negative, the process in step S33 is skipped and the process in step S34 is executed.

In step S33, the processor 81 deletes the candidate point to be an apex of a depression from among the candidate points calculated in step S31 (see FIG. 14). That is, the processor 81 updates the data stored in the memory in step S31 and indicating the candidate points so that the data has the content in which the candidate point to be an apex of a depression has been deleted. Next to step S33, the process in step S34 is executed.

In step S34, the processor 81 generates a composition collision, based on the candidate points. That is, the processor 81 sets, as the composition collision, a polyhedron having as apexes the candidate points stored in the memory (see FIG. 13). The processor 81 stores, in the memory, data indicating the generated composition collision (e.g., data indicating the apexes) as composition collision data. Next to step S34, the process in step S35 is executed.

In step S35, the processor 81 determines whether or not the size of a material part of the composite equipment item generated in step S6 is different from the size of the original material item. When the determination result in step S35 is positive, the process in step S36 is executed. When the determination result in step S35 is negative, the process in step S36 is skipped, and the process in step S37 is executed.

In step S36, the processor 81 performs scaling on the composition collision generated in step S34. That is, the processor 81 changes the size of the composition collision, based on a ratio of the size of the original material item to the size of the material part of the composite equipment item. The composition collision data stored in the memory is updated so that the data has the content indicating the composition collision after the scaling. Next to step S36, the process in step S37 is executed.

In step S37, the processor 81 determines whether or not the original material item of the composite equipment item generated in step S6 is a predetermined type of material item. In the exemplary embodiment, the "predetermined type of material item" is such a material item that a composite equipment item based on this material item has an appearance in which a blade part of an equipment item is replaced with the material item. When the determination result in step S37 is positive, the process in step S38 is executed. When the determination result in step S37 is negative, the process in step S38 is skipped, and the process in step S39 is executed.

In step S38, the processor 81 transforms the equipment collision so as to delete a part of the equipment collision. Specifically, the processor 81 deletes a part, on the tip side, of the equipment collision, according to the method described in the above "[2-2. Method for generating collision of composite equipment item]". Here, the equipment collision to be transformed is the equipment collision of the original equipment item of the composite equipment item generated in step S6. The processor 81 stores data indicating the transformed equipment collision into the memory. Next to step S38, the process in step S39 is executed.

In step S39, the processor 81 generates a composite equipment collision, based on the equipment collision and the composition collision. The composite equipment collision is generated by superposing the equipment collision and the composition collision in the predetermined positional relationship, according to the method described in the above "[2-2. Method for generating collision of composite equipment item]". If the equipment collision has been transformed in the process in step S38, the processor 81 generates the composite equipment collision by using the data that is stored in the memory and indicates the transformed equipment collision. If the equipment collision has not been transformed in the process in step S38, the processor 81 generates the composite equipment collision by using the equipment collision data stored in advance in the memory. The processor 81 stores data indicating the generated composite equipment collision (e.g., data indicating the apexes) into the memory as the composite equipment collision data. After step S39, the processor 81 ends the collision generation process.

If the composite equipment item appears in the game field in a case other than the case where the composite equipment item is generated according to the composition instruction performed by the player (e.g., in a case where the composite equipment item is placed on the game field when the game is started), a composition process similar to that in step S6 and a collision generation process similar to that in step S7 may be executed at a timing when the composite equipment item appears in the game field. Moreover, if the 3D model and the composite equipment collision of the composite equipment item have already been generated when the composite equipment item is possessed by the player character (e.g., if the composite equipment item placed on the game field at the start of the game is acquired by the player character), the 3D model and the composite equipment collision of the composite equipment item need not be newly generated in steps S6 and S7.

Referring back to FIG. 19, in step S8 next to step S7, the processor 81 changes the item possessed by the player character. Specifically, the processor 81 updates the possessed item data stored in the memory so that the data includes the composite equipment item that has been determined in step S5 to be newly possessed. Furthermore, if the composite equipment item has been generated due to the composition instruction performed by the player, the processor 81 updates the possessed item data so that the original equipment item is deleted. Furthermore, the name of the composite equipment item that has been determined in step S5 to be newly possessed may be prepared in advance, or may be generated in step S8. For example, the processor 81 may generate the name of the composite equipment item, based on the name of the original material item and the name of the original equipment item. Moreover, an icon image of the composite equipment item that has been determined in step S5 to be newly possessed may be prepared in advance, or may be generated in step S8. For example, the icon image is used for showing the composite equipment item in a menu image or the like indicating a list of items possessed by the player character. For example, the processor 81 may generate the icon image of the composite equipment item, based on the 3D model of the composite equipment item. Next to step S8, the process in step S9 is executed.

In step S9, the processor 81 generates a game image and displays the game image on the display 12. For example, the processor 81 sets a virtual camera in the game space so as to include the player character in the field-of-view range of the camera, and performs a drawing process based on the virtual camera to generate the game image showing the game space. Thus, the game image in which the behaviors of the objects controlled in steps S2 and S3 are reflected, is displayed. Next to step S9, the process in step S10 is executed.

In step S10, the processor 81 determines whether or not to end the game. For example, when the player has performed a predetermined operation input to end the game, the processor 81 determines to end the game. When the determination result in step S10 is negative, the process in step S1 is again executed. Thereafter, a series of processes in steps S1 to S10 is repeatedly executed until it is determined in step S10 to end the game. When the determination result in step S10 is positive, the processor 81 ends the game processing shown in FIG. 19.

4. Function and Effect of Exemplary Embodiment, and Modifications

A game program according to the above exemplary embodiment has a configuration (referred to as "first configuration") that causes a computer (e.g., the processor 81) of an information processing apparatus (e.g., the game apparatus 2) to execute the following processes.

A process of controlling a player character, based on an operation input (step S2).

A process of generating a first composite equipment item object (e.g., composite equipment item) in response to a first instruction based on an operation input so that a first equipment item object (e.g., equipment item) and a first item object (e.g., material item) are replaced with the first composite equipment item object, the first equipment item object being designated from among a plurality of equipment item objects that the player character possesses and is able to equip and use, the first item object being designated from among a plurality of item objects present in a virtual space, the first composite equipment item object being obtained by compositing the first equipment item object and the first item object, the player character possessing the first composite equipment item object, and being able to equip and use the first composite equipment item object (step S6).

A process of causing, in response to the first instruction, the player character to possess the first composite equipment item object (step S8).

A process of generating, in response to the first instruction, a third collision (e.g., composition collision) based on a first collision (e.g., material collision) of the first item object, and a fourth collision based on the third collision and a second collision (e.g., equipment collision) of the first equipment item object, the fourth collision being a collision of the first composite equipment item object (step S7).

According to the first configuration, since a new composite equipment item object can be generated by compositing the item object and the equipment item object, many types of items are allowed to appear in the game. Furthermore, according to the above configuration, the collision of the composite equipment item object can be automatically generated. In addition, since the collision of the composite equipment item object need not be prepared in advance, the amount of data of collisions for items can be reduced.

(Modification Using Composition Collision as Collision of Material Object)

In the above exemplary embodiment, the composition collision generated based on the material collision is used for generation of the composite equipment collision. In other embodiments, such a composition collision may be used as a collision of a material item corresponding to the original material collision. For example, when the player character has acquired and possessed a material item placed in the game space, the player may use this material item as an equipment item. In this case, the game system 1 may use the composition collision as a collision of the material item used as the equipment item.

Figure 22:
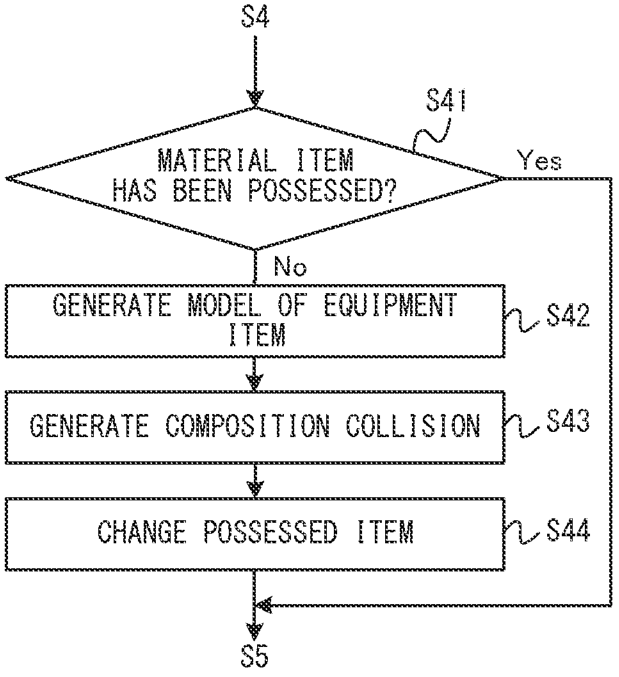
FIG. 22 is a flowchart showing an example of a flow of game processing according to a modification.

FIG. 22 is a flowchart showing an example of a flow of game processing in a modification of the exemplary embodiment. In this modification, processes in steps S41 to S44 shown in FIG. 22 may be executed after step S4 shown in FIG. 19. The game processing in this modification may be identical to that of the exemplary embodiment except for the processes in steps S41 to S44.

In step S41, the processor 81 determines whether or not a material item is newly possessed by the player character. For example, when the player character has picked up a material item according to an action instruction made by the player (step S17), the processor 81 determines that the material item is newly possessed by the player character. When the determination result in step S41 is positive, the process in step S42 is executed. When the determination result in step S41 is negative, the processes in steps S42 to S44 are skipped, and the process in step S5 of the exemplary embodiment is executed.

In step S42, the processor 81 generates a 3D model of an equipment item corresponding to the material item newly acquired by the player, based on a 3D model of the material item. The 3D model of the equipment item is a 3D model in the case where the material item is used as the equipment item, and therefore may have the same appearance as the 3D model of the material item. The 3D model of the equipment item may have an appearance similar to the 3D model of the material item to such an extent that the player recognizes that the equipment item and the material item are the same item. For example, the 3D model of the equipment item may be generated by performing predetermined processing (e.g., scaling) on the 3D model of the material item. Next to step S42, the process in step S43 is executed.

In step S43, the processor 81 generates a composition collision for the material item newly acquired by the player. The composition collision generation method according to this modification may be the same as that of the above exemplary embodiment. Next to step S43, the process in step S44 is executed.

In step S44, the processor 81 changes the items possessed by the player character. Specifically, the processor 81 updates the possessed item data stored in the memory so that the data includes the material item that has been determined in step S41 to be newly possessed. Next to step S44, the process in step S5 is executed.

In this modification, if the player character is equipped with the material item, the processor 81 uses, as a collision of the material item, the composition collision generated in step S43. That is, in the collision determination in step S4, the composition collision is used as the collision of the material item. Thus, even when the material item is used as an equipment item such as a weapon or a protective gear, collision determination can be performed by using a collision having an appropriate shape as a collision of a weapon or a protective gear.

As described above, the material item can take a state of being used as an equipment item and a state of not being used as an equipment item, and different collisions may be set for these two states. In the state where the material item is used as an equipment item, a composition collision generated from the material collision may be used.

A game program according to the above modification has a configuration (referred to as "second configuration") that causes a computer (e.g., the processor 81) of an information processing apparatus (e.g., the game apparatus 2) to execute the following processes.

A process of controlling a player character, based on an operation input (step S2).

A process of generating, in response to a first instruction based on an operation input, a first equipment item object that the player character possesses and is able to equip and use, by using at least a first item object designated from among a plurality of item objects present in a virtual space (step S42).

A process of causing, in response to the first instruction, the player character to possess the first equipment item object (step S44).

A process of generating, in response to the first instruction, a second collision based on a first collision of the first item object, the second collision being a collision of the first equipment item object (step S43).

According to the second configuration, the collision of the equipment item object can be automatically generated. In addition, since the collision of the equipment item object need not be prepared in advance, the amount of data of collisions for items can be reduced. The game program may not necessarily have the first configuration, and may have only the second configuration.

The above exemplary embodiment has shown the example in which the equipment item is a sword object. However, the equipment item may be any type of item object, such as a shield object or bow and arrow objects as described above.

In the exemplary embodiment, when a process is executed by using data (including a program) in a certain information processing apparatus, a part of the data required for the process may be transmitted from another information processing apparatus different from the certain information processing apparatus. In this case, the certain information processing apparatus may execute the process by using the data received from the other information processing apparatus and the data stored therein.

In other embodiments, the information processing system may not include some of the components in the above embodiment, and may not execute some of the processes executed in the above embodiment. For example, in order to achieve a specific effect of a part of the above embodiment, the information processing system only needs to include a configuration for achieving the effect and execute a process for achieving the effect, and need not include other components and need not execute other processes.

The exemplary embodiment can be used as, for example, a game system and a game program, for the purpose of, for example, automatically generating collisions of items.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein instructions that, when executed, cause a processor of an information processing apparatus to execute game processing, comprising:

controlling a player character, based on an operation input;

generating a first composite equipment item object in response to a first instruction based on an operation input so that a first equipment item object and a first item object are replaced with the first composite equipment item object, the first equipment item object being designated from among a plurality of equipment item objects that the player character possesses and is able to equip and use, the first item object being designated from among a plurality of item objects present in a virtual space, the first composite equipment item object being obtained by compositing the first equipment item object and the first item object, the player character possessing the first composite equipment item object, and being able to equip and use the first composite equipment item object;

causing, in response to the first instruction, the player character to possess the first composite equipment item object; and generating, in response to the first instruction, a third collision based on a first collision of the first item object, and a fourth collision based on the third collision and a second collision of the first equipment item object, the fourth collision being a collision of the first composite equipment item object.

2. The non-transitory computer-readable storage medium according to claim 1, wherein the game processing comprises performing collision determination by using the first collision when the first item object is placed in the virtual space.

3. The non-transitory computer-readable storage medium according to claim 1, wherein the game processing comprises setting, based on a shape of the first collision, a polyhedron having not more than a certain number of apexes as the third collision.

4. The non-transitory computer-readable storage medium according to claim 3, wherein the game processing comprises:

calculating points on the first collision which are respectively closest to a plurality of points set outside the first collision; and setting, as the third collision, a polyhedron having, as the apexes, at least some of the closest points.

5. The non-transitory computer-readable storage medium according to claim 4, wherein the plurality of points outside the first collision are set at positions of apexes of a rectangular parallelepiped containing the first collision and at center positions of planes of the rectangular parallelepiped.

6. The non-transitory computer-readable storage medium according to claim 4, wherein a convex polyhedron having, as apexes, at least some of the closest points is set as a shape of the third collision.

7. The non-transitory computer-readable storage medium according to claim 6, wherein out of the closest points, a point at a position that is not an apex of the convex polyhedron is deleted, and the convex polyhedron having the remaining points as the apexes is set as the shape of the third collision.

8. The non-transitory computer-readable storage medium according to claim 2, wherein the game processing comprises, if the first item object is a predetermined type of item object, replacing the first collision with a collision having a different shape when the first composite equipment item object is generated.

9. The non-transitory computer-readable storage medium according to claim 1, wherein the game processing comprises:

generating a 3D model of the first composite equipment item object as a model in which the first item object is disposed at a tip of the first equipment item object; and generating the fourth collision as a shape in which the third collision is disposed at a tip of the second collision.

10. The non-transitory computer-readable storage medium according to claim 9, wherein the fourth collision is generated by deleting at least a part, on a tip side, of the second collision.

11. The non-transitory computer-readable storage medium according to claim 1, wherein the fourth collision is generated by scaling at least one of the first collision and the third collision.

12. The non-transitory computer-readable storage medium according to claim 9, wherein each of the second collision and the third collision is a convex polyhedron.

13. An information processing system comprising:

at least one processor; and at least one memory storing instructions that, when executed, cause the information processing system to execute game processing, comprising:

controlling a player character, based on an operation input;

generating a first composite equipment item object in response to a first instruction based on an operation input so that a first equipment item object and a first item object are replaced with the first composite equipment item object, the first equipment item object being designated from among a plurality of equipment item objects that the player character possesses and is able to equip and use, the first item object being designated from among a plurality of item objects present in a virtual space, the first composite equipment item object being obtained by compositing the first equipment item object and the first item object, the player character possessing the first composite equipment item object, and being able to equip and use the first composite equipment item object;

causing, in response to the first instruction, the player character to possess the first composite equipment item object; and generating, in response to the first instruction, a third collision based on a first collision of the first item object, and a fourth collision based on the third collision and a second collision of the first equipment item object, the fourth collision being a collision of the first composite equipment item object.

14. The information processing system according to claim 13, wherein the game processing comprises performing collision determination by using the first collision when the first item object is placed in the virtual space.

15. The information processing system according to claim 13, wherein the game processing comprises setting, based on a shape of the first collision, a polyhedron having not more than a certain number of apexes as the third collision.

16. The information processing system according to claim 15, wherein the game processing comprises:

calculating points on the first collision which are respectively closest to a plurality of points set outside the first collision; and setting, as the third collision, a polyhedron having, as the apexes, at least some of the closest points.

17. The information processing system according to claim 16, wherein the plurality of points outside the first collision are set at positions of apexes of a rectangular parallelepiped containing the first collision and at center positions of planes of the rectangular parallelepiped.

18. The information processing system according to claim 16, wherein a convex polyhedron having, as apexes, at least some of the closest points is set as a shape of the third collision.

19. The information processing system according to claim 18, wherein out of the closest points, a point at a position that is not an apex of the convex polyhedron is deleted, and the convex polyhedron having the remaining points as the apexes is set as the shape of the third collision.

20. The information processing system according to claim 14, wherein the game processing comprises, if the first item object is a predetermined type of item object, replacing the first collision with a collision having a different shape when the first composite equipment item object is generated.

21. The information processing system according to claim 13, wherein the game processing comprises:

generating a 3D model of the first composite equipment item object as a model in which the first item object is disposed at a tip of the first equipment item object; and generating the fourth collision as a shape in which the third collision is disposed at a tip of the second collision.

22. The information processing system according to claim 21, wherein the fourth collision is generated by deleting at least a part, on a tip side, of the second collision.

23. The information processing system according to claim 13, wherein the fourth collision is generated by scaling at least one of the first collision and the third collision.

24. The information processing system according to claim 21, wherein each of the second collision and the third collision is a convex polyhedron.

25. An information processing apparatus comprising:

at least one processor; and a storage medium storing executable instructions that, when executed, cause the at least one processor to execute game processing, comprising:

controlling a player character, based on an operation input;

generating a first composite equipment item object in response to a first instruction based on an operation input so that a first equipment item object and a first item object are replaced with the first composite equipment item object, the first equipment item object being designated from among a plurality of equipment item objects that the player character possesses and is able to equip and use, the first item object being designated from among a plurality of item objects present in a virtual space, the first composite equipment item object being obtained by compositing the first equipment item object and the first item object, the player character possessing the first composite equipment item object, and being able to equip and use the first composite equipment item object;

causing, in response to the first instruction, the player character to possess the first composite equipment item object; and generating, in response to the first instruction, a third collision based on a first collision of the first item object, and a fourth collision based on the third collision and a second collision of the first equipment item object, the fourth collision being a collision of the first composite equipment item object.

26. A game processing method executed by an information processing system, the information processing system executing:

controlling a player character, based on an operation input;

generating a first composite equipment item object in response to a first instruction based on an operation input so that a first equipment item object and a first item object are replaced with the first composite equipment item object, the first equipment item object being designated from among a plurality of equipment item objects that the player character possesses and is able to equip and use, the first item object being designated from among a plurality of item objects present in a virtual space, the first composite equipment item object being obtained by compositing the first equipment item object and the first item object, the player character possessing the first composite equipment item object, and being able to equip and use the first composite equipment item object;

causing, in response to the first instruction, the player character to possess the first composite equipment item object; and generating, in response to the first instruction, a third collision based on a first collision of the first item object, and a fourth collision based on the third collision and a second collision of the first equipment item object, the fourth collision being a collision of the first composite equipment item object.

* * * * *